United States Patent [19]

Gingold et al.

[11] Patent Number: 5,659,778
[45] Date of Patent: Aug. 19, 1997

[54] SYSTEM AND METHOD OF MAPPING AN ARRAY TO PROCESSING ELEMENTS

[75] Inventors: David Bruce Gingold, Somerville; Kenneth Walter Crouch; Clifford Adam Lasser, both of Cambridge; Harry Mark Bromley, Andover; Guy Lewis Steele, Jr., Lexington, all of Mass.

[73] Assignee: TM Patents, L.P., Boston, Mass.

[21] Appl. No.: 225,923

[22] Filed: Apr. 11, 1994

Related U.S. Application Data

[63] Continuation of Ser. No. 829,480, Feb. 3, 1992, abandoned.
[51] Int. Cl.[6] ............................. G06F 12/02; G06F 15/80
[52] U.S. Cl. ................................................ 395/800.11
[58] Field of Search ............................. 395/800, 700, 395/400, 425

[56] References Cited

U.S. PATENT DOCUMENTS

| | | | |
|---|---|---|---|
| 4,598,400 | 7/1986 | Hillis | 370/60 |
| 4,773,038 | 9/1988 | Hillis et al. | 395/500 |
| 4,827,403 | 5/1989 | Steele, Jr. et al. | 395/800 |
| 4,943,909 | 7/1990 | Huang | 395/800 |
| 4,984,235 | 1/1991 | Hillis et al. | 370/60 |
| 5,050,069 | 9/1991 | Hillis et al. | 395/500 |
| 5,070,446 | 12/1991 | Salem | 395/500 |
| 5,133,073 | 7/1992 | Jackson et al. | 395/800 |
| 5,247,645 | 9/1993 | Mirza et al. | 395/425 |
| 5,274,818 | 12/1993 | Vasilevsky et al. | 395/700 |

OTHER PUBLICATIONS

CM Fortran Programming Guide, Thinking Machines Corporation, Version 1.0, pp. 1–18 and 113–135, first printed Nov. 1989, revised Feb. 1990 and revised Feb. 1991.

CM Fortran Reference Manual, Thinking Machines Corporation, Versions 1.0 and 1.1, pp. 276, 299–301, and 315–318, first printed Feb. 1991 and revised Jul. 1991.

Gary Sabot et al., "CM Fortran Optimization Notes: Slicewise Model", Technical Report TMC–184, Thinking Machines Corporation, Mar. 1991.

Gary Sabot, "Optimized CM Fortran Compiler for the Connection Machine Computer", *Proceeddings of the IEEE Intl. Conf. on System Sciences*, pp. 161–172, Jan. 1992.

*Primary Examiner*—Paul V. Kulik

[57] ABSTRACT

An apparatus and method for efficiently mapping elements of an array to processing elements (PEs) of a parallel data computer. Axis lengths and weights are received from a compiler (if invoked at compile time) or an application program (if invoked at run time). A physical grid is generated by expanding the axis lengths so that their product is integrally divisible by "machine_bits" (i.e., $\log_2$ (number of PEs on the data parallel computer)). The physical grid is divided into subgrids of equal size by dividing each expanded axis length into subgrid lengths of equal length. The lengths and numbers of subgrid lengths in each axis are then output to the compiler or the application program. From the subgrid lengths, the compiler or application program can identify a unique location in one of the subgrids given any location of an element in the array. From the number of subgrids in each axis, the compiler or application program can identify a unique memory location on a unique PE given the subgrid and location identified from the subgrid length.

1 Claim, 16 Drawing Sheets

$sg_0$ { WORD 0 | 1 1 1 1 1 1 1 1 1 1 1 1 1 1 1 1
        WORD 1 | - - - - - - - - 1 1 1 1 1 1 1 1

$sg_1$ { WORD 2 | 1 1 1 1 0 1 1 1 1 1 0 1 1 1 1 1
        WORD 3 | - - - - - - - - 0 1 1 1 1 1 0 1

$sg_2$ { WORD 4 | 1 1 1 1 1 1 1 1 1 1 1 1 1 1 1 1
        WORD 5 | - - - - - - - - 1 1 1 1 1 1 1 1

$sg_3$ { WORD 6 | 1 1 1 0 1 1 1 1 0 1 1 1 1
        WORD 7 | - - - - - - - - 0 1 1 1 1 1 0 1

$sg_4$ { WORD 8 | 1 1 1 1 1 1 1 1 1 1 1 1 1 1 1 1
        WORD 9 | - - - - - - - - 1 1 1 1 1 1 1 1

$sg_5$ { WORD 10 | 1 1 1 0 1 1 1 1 0 1 1 1 1
        WORD 11 | - - - - - - - - 0 1 1 1 1 1 0 1

$sg_6$ { WORD 12 | 1 1 1 1 1 1 1 1 1 1 1 1 1 1 1 1
        WORD 13 | - - - - - - - - 0 0 0 0 0 0 1 1

$sg_7$ { WORD 14 | 1 1 1 0 1 1 1 1 0 1 1 1 1
        WORD 15 | - - - - - - - - 0 0 0 0 0 0 0 1

SYSTEM AND METHOD OF MAPPING AN ARRAY TO PROCESSING ELEMENTS

This application is a continuation of application Ser. No. 07/829,480 filed Feb. 3, 1992 now abandoned.

A portion of the disclosure of this patent document contains material which is subject to copyright protection. The copyright owner has no objection to the facsimile reproduction by anyone of the patent disclosure, as it appears in the Patent and Trademark Office patent files or record, but otherwise reserves all copyright rights whatsoever.

CROSS-REFERENCE TO OTHER APPLICATIONS

The following applications are assigned to the assignee of the present application:

U.S. patent application Ser. No. 07/042,761, now U.S. Pat. No. 5,050,069, filed Apr. 27, 1987, by W. Daniel Hillis, entitled "Method and Apparatus for Simulating M-Dimensional Connection Networks in an N-Dimensional Network Where M is Less Than N", incorporated herein by reference.

U.S. patent application Ser. No. 07/830,564, filed Feb. 3, 1992 entitled "System and Method for Optimizing and Generating Computer-Based Code In a Parallel Processing Environment", incorporated herein by reference.

U.S. patent application Ser. No. 07/827,945, filed Feb. 3, 1992, entitled "System and Method for Compiling Towards a Super-Pipelined Architecture", incorporated herein by reference.

U.S. patent application Ser. No. 07/827,942, now U.S. Patent No. 5,274,818, filed February entitled "Vector Parallel Machine Model", incorporated herein by reference.

INCORPORATION BY REFERENCE

U.S. Pat. No. 4,589,400, issued Jul. 1, 1986, to W. Daniel Hillis, for "Method and Apparatus for Routing Message Packets", and assigned to the assignee of the present application, incorporated herein by reference.

U.S. Patent No. 4,984,235, issued Jan. 8, 1991, to Hillis et al., for "Method and Apparatus for Routing Message Packets and Recording the Routing Sequence", and assigned to the assignee of the present application, incorporated herein by reference.

BACKGROUND OF THE INVENTION

1. Field of the Invention

The present invention relates generally to an apparatus and method for performing domain decomposition and, more particularly, to an apparatus and method for performing domain decomposition for a data parallel computer.

2. Related Art

A data parallel computer has many processors, each with some associated memory and all acting under the direction of a serial computer called a host. The host and data parallel computer could reside in a single machine.

A data parallel computer has many processing elements (called PEs) each with some associated memory and all acting under the direction of a serial computer called a host computer. On some data parallel computers, the host computer and PEs reside in a single machine. In general, the host computer performs serial tasks and dispatches parallel tasks to the PEs. For example, the host computer can distribute elements of an array to the PEs so that the data parallel computer can process the array in a parallel manner. The speed with which the data parallel computer can process the arrays depends greatly on how the array elements are mapped to the processing elements.

If this conventional mapping technique is to map the array elements as explicitly specified in an application program. Because the programmer (i.e., the operator of the application program) generally knows how the array data will be processed, he or she can usually determine an efficient mapping. Defining a mapping, however, is quite complex. As a result, the first technique adds substantially to the difficulty of writing application programs for, or adapting application programs to, parallel data computers.

A second mapping technique is that used in the Thinking Machines Corporation CM Fortran Release 0.5. According to the second technique, the run time system handles the array element to PE mapping, thereby relieving the programmer of this task. The second technique works as follows. Each array axis is assigned $\log_2$ (axis length) "off-chip bits" until there are no more off-chip bits. Off-chip bits are the bits of a parallel data computer address which identify the various PEs. Then, any axis not assigned off-chip bits is assigned $\log_2$ (axis length) "on-chip bits". On-chip bits are bits of the parallel data computer address which identify a particular memory location on the PE identified by the off-chip bits.

Although the second technique simplifies programming the data parallel computer, applications on which it is invoked exhibit poor performance. Specifically, performance is unbalanced between the array axes, as axes assigned off-chip bits perform substantially better than those assigned on-chip bits.

Therefore, there is a need for an array to PE mapping technique which is implemented in the system software (or hardware) of the data parallel computer and which results in efficient processing of arrays.

SUMMARY OF THE INVENTION

Accordingly, the present invention is directed toward an apparatus and method which is part of a data parallel computer compiler or runtime system, and which maps array elements to PEs in proportion to array axis lengths.

The present invention operates as follows. An apparatus and method for efficiently mapping elements of an array to processing elements (PEs) of a parallel data computer. Axis lengths and weights are received from a compiler (if invoked at compile time) or an application program (if invoked at run time). A physical grid is generated by expanding the axis lengths so that their product is integrally divisible by "machine_bits" (i.e., $\log_2$ (number of PEs on the data parallel computer)). The physical grid is divided into subgrids of equal size by dividing each expanded axis length into subgrid lengths of equal length. The lengths and numbers of subgrid lengths in each axis are then output to the compiler or the application program. From the subgrid lengths, the compiler or application program can identify a unique location in one of the subgrids given any location of an element in the array. From the number of subgrids in each axis, the compiler or application program can identify a unique memory location on a unique PE given the subgrid and location identified from the subgrid length.

BRIEF DESCRIPTIONS OF THE DRAWINGS

The present invention will be described with reference to the accompanying drawings, wherein:

FIG. 5 is a garbage mask for the physical grid of FIG. 4.

DETAILED DESCRIPTION OF THE PREFERRED EMBODIMENTS

Hardware and Software Environment of the Present Invention

The present invention is directed to a domain decomposition apparatus and method for a data parallel computer. In a preferred environment of the present invention, the data parallel computer is one manufactured by Thinking Machines Corporation, such as the Connection Machine® CM-2™ and CM5™ Supercomputers. These are described in U.S. Pat. No. 4,589,400 to Hillis, U.S. Pat. No. 4,984,235 to Hillis et al., and U.S. patent application Ser. No. 07/042,761, now U.S. Pat. No. 5,050,069, entitled "Method and Apparatus for Simulating M-Dimensional Connection Networks in an N-Dimensional Network Where M is Less Than N", filed Apr. 27, 1987, by Hillis, all of which were cited above.

Specifically, U.S. Pat. 4,589,400 describes a massively-parallel computer, including one embodiment of processors and router, with which the present invention can be used. U.S. Pat. No. 4,984,235 describes a massively-parallel computer. U.S. patent application Ser. No. 07/042,761, now U.S. Pat. No. 5,050,069, entitled "Method and Apparatus for Simulating M-Dimensional Connection Networks in an N-Dimensional Network Where M is Less Than N", describes, in a massively parallel computer including processor chips interconnected by a hypercube, an arrangement for emulating 2-, 3-, or higher dimensional nearest-neighbor communication network ("NEWS") between chips using the hypercube wires.

Figure 1:
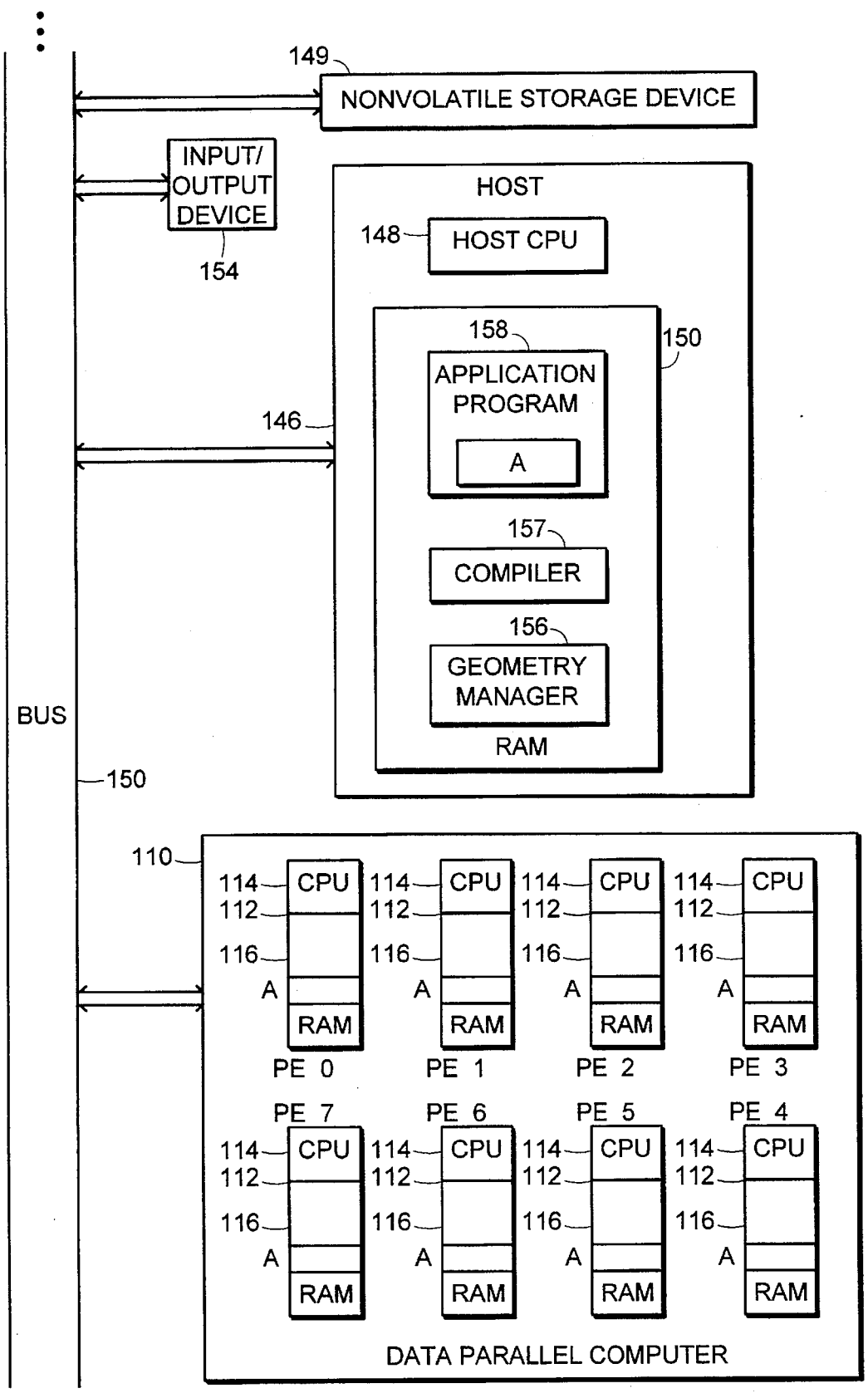
FIG. 1 shows a block diagram of a preferred environment in which the present invention could operate.

FIG. 1 shows a block diagram of the structure of a preferred environment in which the present invention could operate. To facilitate explanation, the block diagram shows a simplified view of the actual structure of the preferred embodiment. A data parallel computer 110 is comprised of a plurality of processing elements (PEs) 112. An actual data parallel computer could have many thousands of PEs 112. For clarity, the data parallel computer 110 illustrated has only eight PEs 112 (PE0 to PE7). Each PE 112 has a CPU 114 and a random access memory (RAM) 116.

The data parallel computer 110 is electrically connected to a host computer 146, to a non-volatile storage device 148, and to an input/output device 154 via a bus 152. The host computer 146 is a serial computer such as a Sun 4 (manufactured by Sun Microsystems, Inc.) or a VAX (manufactured by Digital Equipment Corp.). The host computer 146 comprises a single host CPU (or a small number of host CPUs) 148 and a RAM 150.

The environment of the present invention further includes various software modules, including a geometry manager 156 a compiler 157 and an application program 158. The software modules could reside in the RAM 150 of the host compiler 146, in the non-volatile storage device 149, or in some combination of the two. In FIG. 1, the software modules are shown in the RAM 150. Note that the geometry manager 156 could also be implemented in hardware, for example, as part of the CPU 148.

Overview Of Array Mapping

The present invention is an apparatus and method for mapping array elements to PEs, and for organizing the array elements in a regular manner within the memory (i.e., the RAMs 116) of the PEs 116. More specifically, the present invention comprises the geometry manager 156 which receives attributes of an array and of the data parallel computer 110, and generates an array geometry structure. The array geometry structure specifies a mapping from each array element to a particular memory location in the RAM 116 of one of the PEs 112. The geometry manager 156 generates the mapping so as to facilitate efficient processing of the array. FIG. 1 illustrates an array "A" described by the application program 158 to the geometry manager 156, and a mapping of A to a portion of the RAM 116 of each of the PEs 112.

The mapping process requires a substantial amount of overhead. Accordingly, performing it at compile time may increase performance. Doing so, however, is only possible for arrays which are fully specified at compile time. Furthermore, because different data parallel computers 110 may have different numbers of PEs 112, execution of the compiled program would be limited to those machines which have the number of PEs 112 specified in the mapping. If the mapping is performed at run time, on the other hand, the same compiled code can be used with data parallel computers 110 having diverse numbers of PEs 112.

Conceptually, the present invention operates as follows. It maps contiguous array elements along each array axis to an axis (called an extended axis) of a physical grid. It then divides each extended axis into a number of portions of equal length (called subgrid lengths) so as to create subgrids of equal size. Note that while the subgrid lengths in one axis must be of equal length, they can differ from the subgrid lengths of other axes.

Contiguous subgrids (i.e., those adjacent to one another on the physical grid) are then mapped to contiguous PEs 112 (i.e., those adjacent to one another in the interconnection network of the data parallel computer 110. Accordingly, contiguous array elements are generally mapped to contiguous memory, locations of one of the PEs 112, or to contiguous PEs 112.

The ideal mapping of an array to PEs 112 depends on how the array elements are processed. Algorithms in the application program 158 which operate directly on the array elements largely fall into two categories: those which operate on all of the array elements regardless of the layout of the array, and those which perform operations along array axes. The geometry manager 156, in turn, comprises two array-to-subgrid mappers to generate efficient mappings for either case. Looking at FIG. 2, the user can specify (in the source code of the application program 158) a computation minimizing mapper 210 for arrays processed in the first manner described above, and a communication reducing mapper 212 for arrays processed in the second manner described above. Overviews of the computation minimizing mapper 210 and of the communication reducing mapper 212 are presented in the following two sections of this document. The mappers 210 and 212 are described in detail in the sections entitled, "*Computation Minimizing Mapper—Structure And Method,*" and "*Communication Reducing Mapper—Structure And Method*".

Alternatively, the programmer can explicitly specify the subgrid lengths and the expanded axis lengths to be used in the mapping.

Figure 2:
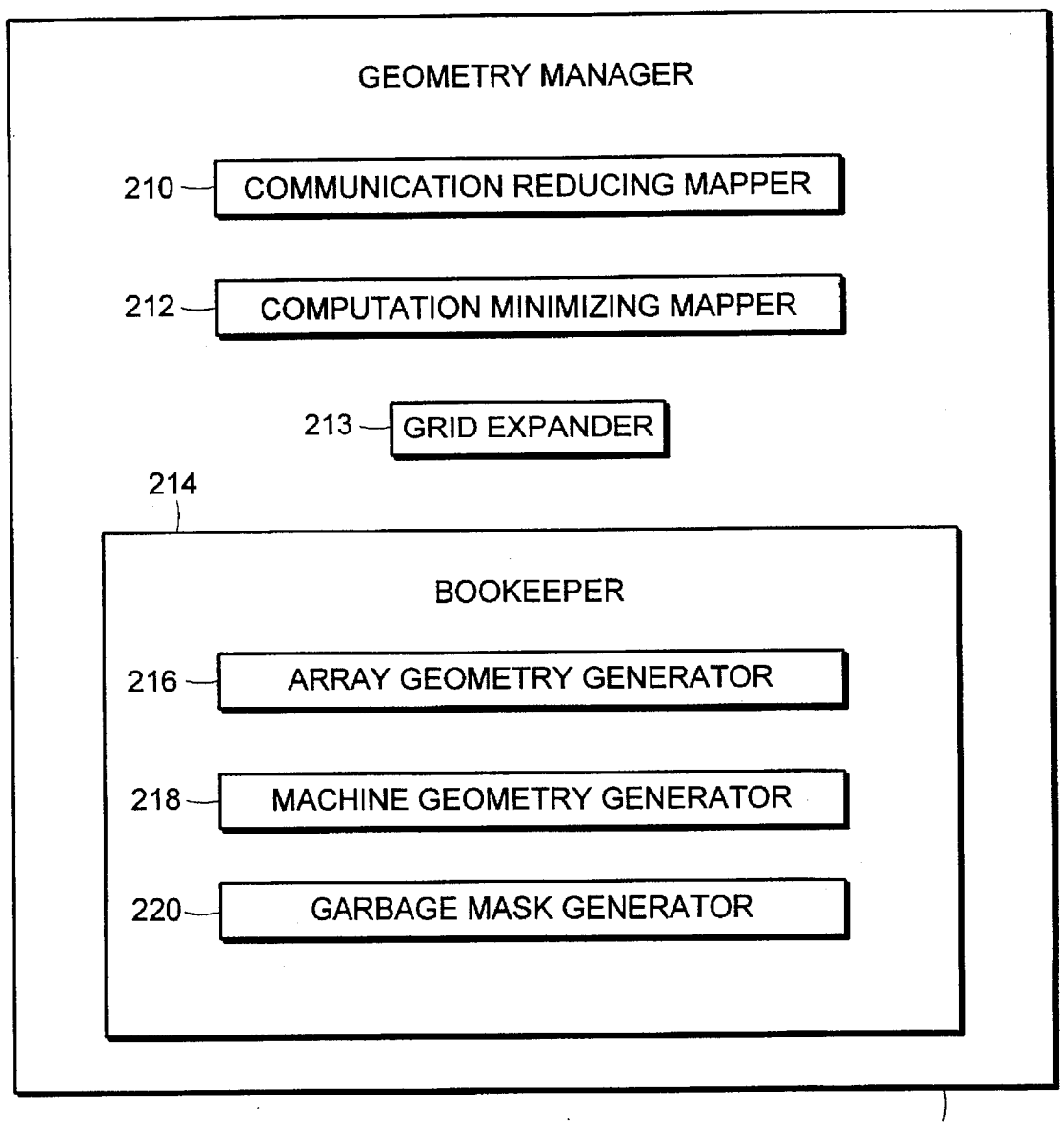
FIG. 2 shows the structure of a geometry manager of FIG. 1.

Looking again at FIG. 2, the geometry mapper 156 further comprises a bookkeeper 214 for managing the data gene, rated by the mappers 210 and 212. The bookkeeper 214 is described in the section "*Geometry Manager—Structure And Method.*"

Computation Minimizing Mapper—Overview

The computation minimizing mapper 210 minimizes the number of array elements mapped to each of the PEs 112. It thereby minimizes the amount of computation performed on the array elements by each of the PEs 112. Accordingly, it generates the most efficient mapping for application programs which generally operate on all of the array elements regardless of the layout of the array.

The computation minimizing mapper 210 operates essentially as follows. It first expands the axis lengths as little as possible to make the product of the expanded values integrally divisible by the number of PEs 112 (or, if the data parallel computer 110 is a vector machine, by the sum of the number of PEs 112 and the vector size). The expanded axis lengths define a physical grid.

Figure 3:
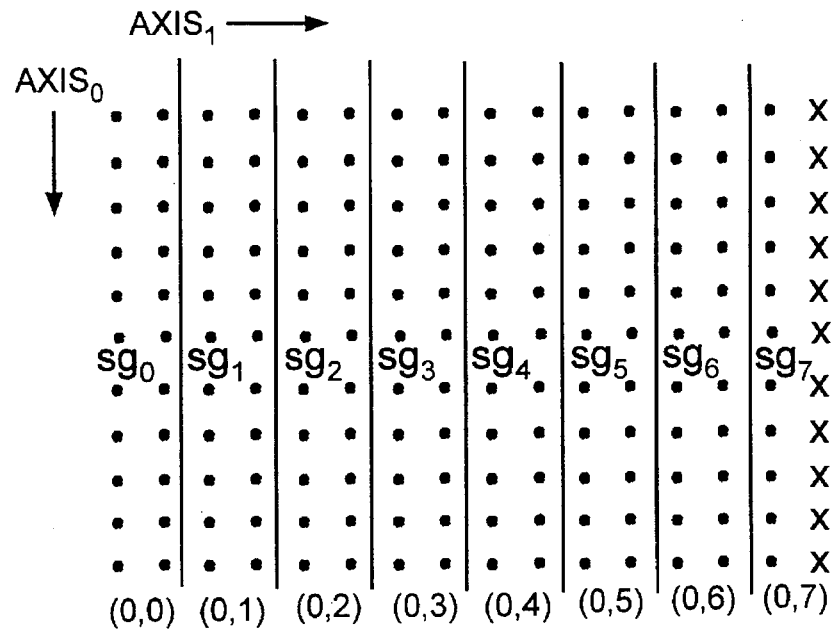
FIG. 3 shows a physical grid generated by a computation minimizing mapper of the geometry manager.

FIG. 3 shows a physical grid 300 which the computation minimizing mapper 210 would generate for the array A. Assume that the array A has 11 elements in axis 0 and 15 elements in axis 1, and that the vector length of the parallel data computer 110 is 4. Further assume that the data parallel computer 110 has the eight PEs 112. The computation minimizing mapper 210 calculates the expanded axis lengths, and thus the lengths of axis 0 and axis 1 of the physical grid 300 to be 11 and 16, respectively. Thus it expanded the array axis lengths physical grid 300 by one in axis 1. Accordingly, the last location in each row of the physical grid is denoted with an "x" (rather than a "•") to indicate that it does not represent an array element.

Next, the computation minimizing mapper 210 divides the physical grid 300 into s subgrids of equal size, where s=the number of PEs 112. The computation minimizing mapper 210 calculates the layout of eight subgrids (sg 0–sg 7) on the physical grid 300 as follows. For each axis, it calculates the largest power of two which is no greater than the number of PEs 112 and which integrally divides the expanded length of that axis. This value is the number of subgrids in the axis. For the physical grid 300, this value is 1 for axis 0 and 8 for axis 1. The $\log_2$ of each such value is the off-chip bit length of the corresponding axis of the physical grid 300. Accordingly, the physical grid 300 has no off-chip bits (and therefore one subgrid) in axis 0, and three off-chip bits (and therefore eight subgrids) in axis 1.

Communication Reducing Mapping—Overview

Although the computation minimizing mapper 210 maps an array so as to minimize computation, in some cases the mapping it generates will result in an unnecessarily large amount of costly communication between the PEs 112.

Therefore, in a communication-intensive application program 158, it may be desirable to reduce communication (possibly at the cost of increasing computation time) by the use of the communication reducing mapper 212.

The general goal of the communication reducing mapper 212 is to generate a physical grid which closely conforms to the layout of the array. It operates essentially as follows. It first allocates m off-chip bits among n physical grid axes, where m=the number of machine bits (i.e., the $\log_2$ (number of PEs 112) and n=the number of axes in the array. The number of off-chip bits allocated to each axis is proportional to $\log_2$ (extended axis lengths). The sum of the off-chip bits is generally m. However, it may be less than m if the number of array elements is less than the number of PEs 112.

Figure 4:
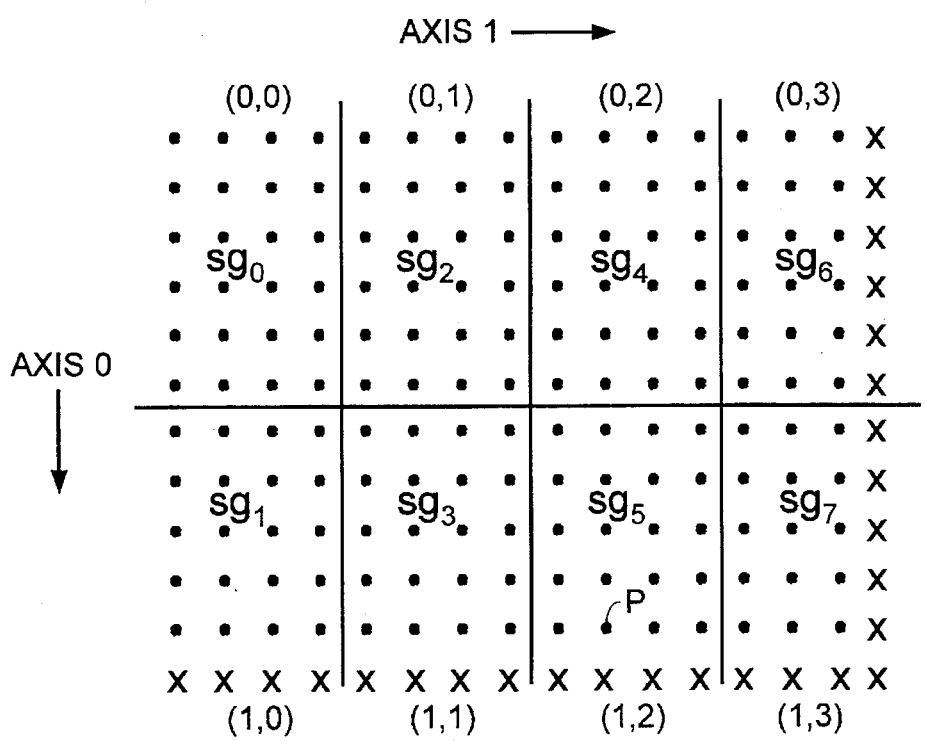
FIG. 4 shows a physical grid generated by a communication reducing mapper of the geometry manager.

Looking at a physical grid 400 of FIG. 4, (still assuming that the data parallel computer 110 has the eight PEs 112) there are 3 (=$\log_2 8$) off-chip bits to allocate. The communication reducing mapper 212 allocates one of the off-chip bits to axis 0 and two of the off-chip bits to axis 1, in proportion to $\log_2 11$ and $\log_2 15$, respectively. Thus, there are 2(=$2^1$) subgrids in axis 0 and 4(=$2^2$) subgrids in axis 1.

The communication reducing mapper 212 then calculates an expanded length for each axis of the physical grid 400 by expanding the corresponding array axis length by the smallest amount necessary to make it integrally divisible by the number of subgrids in the axis. Accordingly, in the physical grid 400 of FIG. 4, the expanded length of axis 0 is 12, and the expanded length of axis 1 is 16. Because axis 0 was expanded by one and axis 1 was expanded by 1, the last location in each row and column of the physical grid is denoted by an "x" rather than a "•". Because there are two subgrids in axis 0 and four subgrids in axis 1, the subgrid length is six (=12/2) in axis 0 and four (=16/4) in axis 1.

Correspondence Between Array Elements and Physical Grid Locations

The computation minimizing mapper 210 and the communication reducing mapper 212 map each array element to a unique location of a unique subgrid in a physical grid. A subgrid coordinate specifies the location within the subgrid by a position along each axis of the subgrid. A physical coordinate specifies the position of a subgrid along each axis of the physical grid. An axis coordinate specifies the position of an array element in every axis of the array.

The correspondence between array coordinates and physical and subgrid coordinates is as follows:

Physical-coordinate[axis]=axis-coordinate[axis] div subgrid-length[axis]

Subgrid-coordinate[axis]=axis-coordinate[axis] mod subgrid-length[axis]

To illustrate the correspondence between array coordinates of the array A and the physical and subgrid coordinates of the physical grid 400 of FIG. 4, suppose that a point P in A has array coordinates (10,9). The physical and subgrid coordinates of P are calculated as follows:

Physical-coordinates=(10 div 6, 9 div 4)=(1,2)

Subgrid-coordinates=(10 mod 6, 9 mod 4)=(4,1).

Looking at FIG. 4, the point P is at the subgrid location having subgrid coordinates (4,1) of a subgrid sg 5 (located at physical coordinates (1,2)).

Correspondence Between Physical Grid Locations and Memory Locations of PEs

Once the computation minimizing mapper 210 or the communication reducing mapper 212 has mapped the array onto the physical grid, the bookkeeper 214 calculates a mapping from each location of the subgrids to a memory location of the RAM 116 of one of the PEs 112. Each of the PEs 112 is identified by a PE id. Each memory location in the RAM 116 of each of the PEs 112 is identified by a subgrid index.

The physical coordinates map to the PE id's as follows. The fact that the number of PEs 112 is a power of two facilitates representing a physical coordinate as a string of bits. The string is divided into portions, one for each axis of the physical grid. The bits in each portion indicate the physical coordinate in one axis. The "off-chip length" of an axis is the number of bits in the portion corresponding to that axis. The "off-chip bits position" of an axis indicates the position of the portion of the bit string corresponding to that axis.

The specific correspondence between physical coordinates and PE id's is:

$$PE\text{-}id = \sum_{axis=0}^{rank-1} \text{physical-coordinate}[axis] \cdot 2^{\text{off-chip-bits-position}[axis]}$$

where "rank" is the number of axes in the array.

For the CM-2, this description is not quite complete. Each machine geometry axis has an order attribute—it is either send-ordered or news-ordered. Typically axes are news-ordered. An axis which is news-ordered sets off-chip bits according to the gray code of it's physical-coordinate. So the complete description for the CM-2 is:

$$PE\text{-}id = \sum_{axis=0}^{rank-1} \text{coded-physical-coordinate}[axis] \cdot 2^{\text{off-chip-bits-position}[axis]}$$

where, for news-ordered axes, coded-physical-coordinate[axis] = gray-code(physical-coordinate[axis])

and for send-ordered axes, coded-physical-coordinate[axis] = physical-coordinate[axis]

In any case, the off-chip bits lengths and positions make up a contiguous set of bits, and the lowest off-chip position is zero.

In the physical grid 400 of FIG. 4, the first bit of the address bit stream represents the two subgrids in axis 0. Accordingly, the off-chip length of axis 0 is 1, and the off-chip bits position of axis 0 is 0. The second and third bits of the address bit stream represent the 4 subgrids in axis 1. Accordingly, the off-chip length of axis 1 is 2, and the off-chip bits position of axis 1 is 1. As stated, the physical coordinates of P are (1,2). Therefore, P is on the PE 112 specified by the PE 112 id $(1 \cdot 2^0)+(2 \cdot 2)$, that is, PE 5.

The subgrid locations are mapped to locations in the RAMs 116 of the PEs 112 as follows. An order is determined for the axes, and a "subgrid increment" is calculated in this order for each axis. The order may be that indicated by the axis numbers, or it may be the reverse of that order. The "subgrid increment" of an axis is the number of elements incremented to traverse memory of a PE 112 along that axis in a subgrid. The subgrid increment of an axis is calculated by taking the product of the subgrid increments of the previous axes. Accordingly, the arrangement of subgrid locations in the RAMs 116 of the PEs 112 is mathematically described as:

$$\text{subgrid-index} = \sum_{axis=0}^{rank-1} \text{subgrid-coordinate}[axis] \cdot \text{subgrid-increment}$$

Looking at the physical grid 400 of FIG. 4, assume the order is that indicated by the axis numbers. The subgrid axis increment for axis 0 is 1, and the subgrid increment for axis 1 is 6. The subgrid-index for element P is calculated as follows:

$(4 \cdot 1)+(0 \cdot 6)=10$

Accordingly, the array element at point P (array coordinate (10,9)) would map to the location of the RAM 116 specified by the subgrid index 10 of PE 5.

Serial Axes

As stated, the application program 158 may specify an array axis as serial. A serial axis is treated directly as an array of lower dimensionality, without requiring any extra data movement. The use of serial axes is discussed in detail in the Thinking Machines publication entitled, "Fortran Performance Hints," which is hereby incorporated by reference as if set forth in full below. Essentially, a serial axis is used to optimize communication along an axis. Communication is optimized because elements along a serial axis will be mapped to a single PE 112.

Serial axes differ from non-serial axes as follows:

Note that subgrid mapping is performed before considering serial axes. Therefore, serial axes never need to be padded.

For example, suppose the geometry manager 156 is invoked on an array having axis lengths (2, 7, 11), where the first axis is serial. The non-serial axes will be laid out exactly as they are for the (7, 11) array, and the serial axis will have a higher subgrid increment than the other axes. The geometry is described as:

```
Array geometry id: 0x6cce48
  Rank: 3
  Number of elements: 154
  Extents: [2 7 11]
  Machine geometry id: 0x3782c8, rank: 3, row major
    Machine geometry elements:    192
    Overall subgrid size:         48
  Axis 0 (serial axis):
    Extent:    1 (1 physical × 2 subgrid)
    Off-chip:  0 bits, mask = 0x0
    Subgrid:   1 length = 2, axis-increment = 24
  Axis 1:
    Extent:    8 (2 physical × 4 subgrid)
    Off-chip:  1 bits, mask = –0x1
    Subgrid:   length = 4, axis-increment = 1
  Axis 2:
    Extent:    12 (2 physical × 6 subgrid)
    Off-chip:  1 bits, mask = 0x2
    Subgrid:   length = 6, axis-increment = 4
```

The resulting layout of the array elements on the RAM 116 of the PEs 112 is:

```
(0, 0, 0)
(0, 1, 0)
(0, 2, 0)
. . .
(0, 6, 0)
(0, 0, 1)
(0, 1, 1)
. . .
```

-continued

```
(0, 6, 11)
(1, 0, 0)
(1, 1, 0)
(1, 2, 0)
. . .
(1, 6, 0)
(1, 0, 1)
(1, 1, 1)
. . .
(1, 6, 11)
```

The array elements (0, 0, 0) through (0, 6, 11) are laid out exactly as the subgrid elements are in the two-dimensional case, the same is true for (1, 0, 0) through (1, 6, 11). For Fortran this means that the (n,:,:) array can be viewed as an array of lower dimensionality without having to move data.

Garbage Mask

Often, not all of the locations of a physical grid represent data. For example, the x's in the physical grid 300 of FIG. 3 and the physical grid 400 of FIG. 4 indicate such locations. Also, the number of array elements may be less than the number of PEs 112. In either case, certain RAM 116 memory locations will contain valid data on some, but not all, of the PEs 112. A structure called a garbage mask facilitates array processing by enabling the data parallel computer 110 to carry out operations on the data in all of the PEs 112 at the memory locations specified by the current subgrid index, whether or not the data is valid. Before performing a communication operation, the garbage mask is consulted (by the run-time system) to ensure that only valid data are sent.

The garbage mask could be implemented as an array of bits in which a bit is 1 where the physical grid corresponds to an array element (where the ·'s are in FIGS. 3 and 4) and is 0 elsewhere (where the x's are). The garbage mask bits could be packed into 32-bit words. What would normally be the first element in the subgrid of an array is the low-order bit in the first word of the garbage mask. The second element is the next bit in the first word, the 33rd element in the low-order bit in the second word, and so on.

FIG. 5 shows a garbage mask 500 for the physical grid 400 of FIG. 4. For clarity, the garbage mask 500 is shown packed into 16-bit (rather than 32-bit) words. Looking at FIG. 5, 16 words (word 0–word 15) represent the eight subgrids (sg$_0$–sg$_7$) of FIG. 4. The word "0" represents the first 16 locations of subgrid 0. Each of these locations represents valid data, and therefore all of the bits in the word zero are 1. The low-order 8-bits of word 1 represent the last 8 bits of sg$_0$. These locations also represent valid data, and therefore the corresponding bits are 1. The high-order 8 bits of word 1 do not correspond to any subgrid locations. The –'s drawn in the high-order bits indicate that it does not matter whether these are zeros or ones.

The remaining even-numbered words represent the first 16 locations of the subgrids sg$_1$–sg$_7$. The remaining odd-numbered words represent the last eight locations of the subgrids sg$_1$–sg$_7$.

Array Geometry Structure

The geometry manager 156 must convey the array mapping data to the application program 158 (if invoked at run time) or the compiler 156 (if invoked at compile time). It does so through an array geometry structure. The array geometry structure includes fields for the garbage mask structure and for a machine geometry structure. The garbage mask structure is described in the preceding section. The machine geometry structure has the following fields: Rank, *orders, *off_chip_position, *off_chip_length, *subgrid_axis_length, *is_serial and highest_axis_varies_factor. The first five fields are described above. The sixth, *is_serial, indicates whether each axis is serial. The seventh, highest_axis_varies_factor, indicates whether the subgrid strides should increase or decrease with the axis numbers. The array geometry structure further includes the following fields:

- int4 rank;
  The number of axes in the grid.
- log4 highest_axis_varies_fastest;
  The axis ordering specified when the geometry was created.
- struct CMCOM_axis_descriptor
  axis_descriptors[CMCOM_MAX_RANK];
  Descriptors for each axis (described in detail below).
- int4 product_subgrid_lengths;
  The total number of elements in the subgrid. For the CM-2, this is always a multiple of four.
- log4 array_is_power_of_two;
  True if all of the subgrid lengths are powers of two, i.e., the physical grid has not been padded.
- int4 total_off_chip_length;
  The total of all of the off-chip bits lengths, equal to the log$_2$ of the number of PEs when all of the PEs are used.

An axis descriptor is a structure which contains the following information about an axis. Note that most of this information is redundant and is stored only to prevent having to compute these values at run time.

- int4 off_chip_position;
  The off-chip bits position.
- int4 off_chip_length;
  The off-chip bits length.
- int4 subgrid_length;
  The subgrid-length.
- int4 is_serial;
  True if the axis was declared as a serial axis when the geometry was allocated.
- int8 axis_length;
  =subgrid-length · $2^{\text{off-chip-bits-length}}$
- unsigned4 off_chip_mask;
  = $(2^{\text{off-chip-bits-length}-1}) \cdot 2^{\text{off\_chip\_bits\_position}}$
- int4 subgrid_axis_increment;
  As defined above.
- int4 subgrid_outer_increment;
  = subgrid-axis-increment · subgrid-length
- int4 subgrid_outer_count;
  The product of the subgrid lengths of all axes which have larger subgrid axis increments than this axis.
- int4 subgrid_orthogonal_length;
  The product of the subgrid lengths of all other axes.
- int4 power_of_two;
  True when subgrid-outer-increment is an integer power to two.
- int4 subgrid_bits_position;
  = log$_2$(subgrid_axis_increment), valid when power-of-two is true.
- int4 subgrid_bits_length;
  = $(s^{\text{subgrid-bits-length}}-1) \cdot s^{\text{subgrid-bits-position}}$, valid when power-of-two is true.
- CMCOM_order_t order;
  The axis order (on the CM-2 only).

Geometry Manager—Structure And Method

Figure 6A:
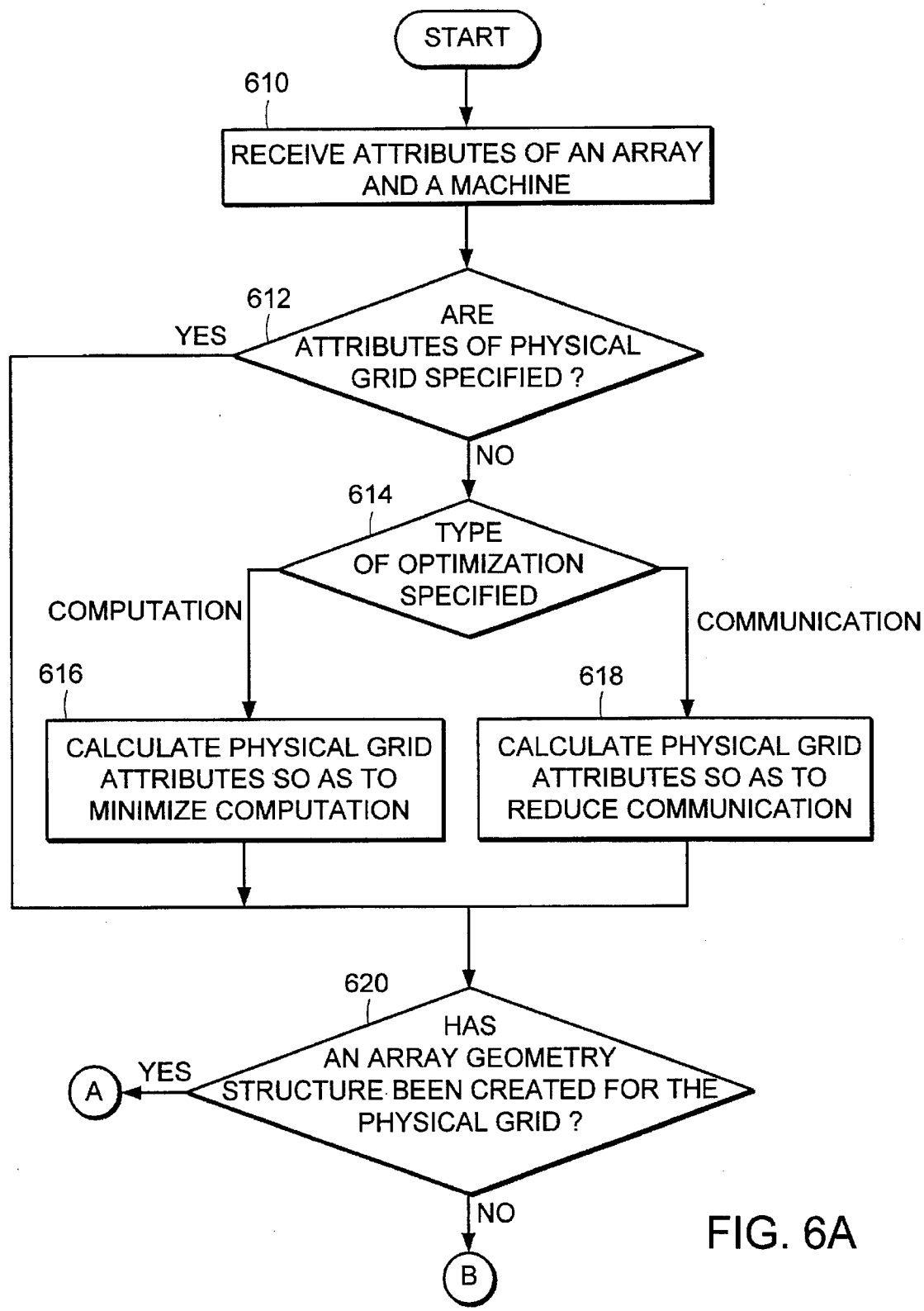
FIGS. 6A and 6B are a flowchart which illustrates the operation of the geometry manager.
Figure 6B:
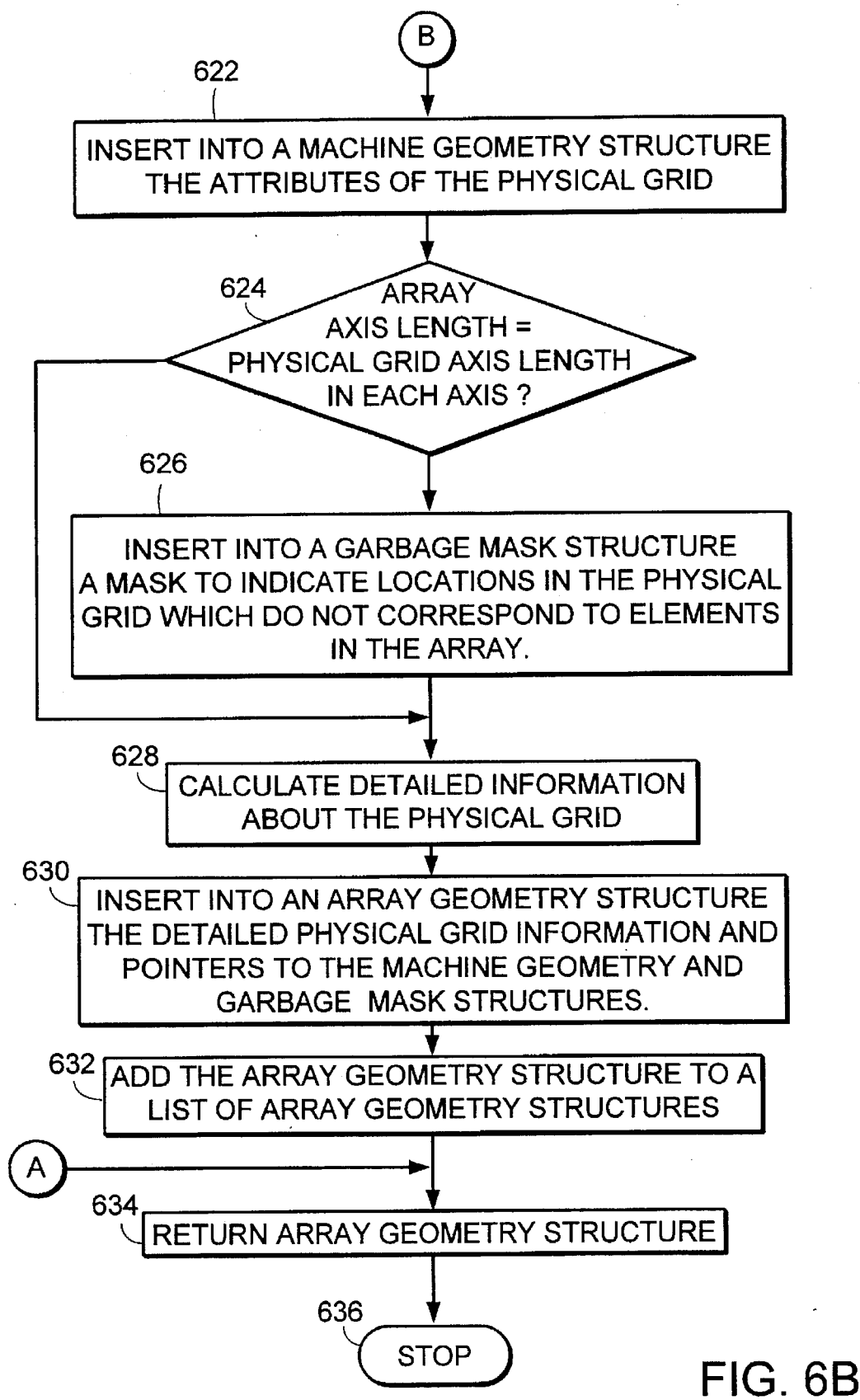

FIG. 6 is a flowchart which illustrates the operation of the modules of FIG. 3. Looking at FIG. 6, in a step 610 the geometry manager 156 receives attributes of an array and of a parallel data processor 110 from the application program 158. In a step 612, the geometry manager 156 determines whether the programmer had specified (in the application program 158) attributes of a physical grid in the application program 158. If so, flow of control of the geometry manager 156 goes to the step 620 (described below). Other, vise, the geometry manager 156 proceeds as follows.

In a step 614, the geometry manager 156 determines whether the programmer specified that the array should be mapped so as to minimize computation or so as to reduce communication. If minimization of computation was specified, then in a step 616 the computation minimizing mapper 210 calculates the physical grid attributes so as to minimize the number of array elements mapped to each PE 112. The operation of the computation minimizing mapper 210 is explained in greater detail below in the section "Computation Minimizing Mapper—Structure and Method."

Otherwise, in a step 618 the communication reducing mapper 212 calculates physical grid attributes so that, in each dimension the number of subgrids is proportional to the array axis length. The communication reducing mapper 212 is described in greater detail below in the section "Communication Reducing Mapper—Structure and Operation".

After the step 616, the step 618, or a positive determination in the step 612, in a step 620 the bookkeeper 214 determines whether an array geometry structure has been created for the subgrid dimensions of the array. If so, then the flow of control of the geometry manager 156 goes to the step 632, which is explained below. Otherwise, the bookkeeper 214 proceeds as follows.

Appropriate Elements.

These elements are described in the section "Array Geometry". The values of these elements are all known at this point. The order, is_serial and highest_axis_varies_fastest elements are specified by the programmer in the application program 158. The off_chip_positions, off_chip_lengths and subgrid_axis_lengths are either specified by the application program, calculated by the computation minimizing mapper 210, or calculated by the communication minimizing mapper 212.

In a step 624, the bookkeeper 214 determines whether the grid expander 213 extended the length of any array axis in generating the physical grid. If so, then in a step 626 the garbage mask generator 220 inserts into a garbage mask structure a mask to indicate locations in the physical grid which do not correspond to elements in the array. The garbage mask structure is described in more detail above in the section "Garbage Mask". Otherwise, or after the step 626, in a step 628 an array geometry generator 216 of the bookkeeper 214 calculates detailed information about the physical grid. More specifically, it calculates the values of the fields of the array geometry structure (other than the values of two pointers to structures). Then, in a step 630, the array geometry generator 216 inserts the values calculated in the step 628 into the array geometry structure. It also inserts into the array geometry structure a pointer to the machine geometry structure and a pointer to the garbage mask structure (if any).

In a step 632, the bookkeeper 214 adds the array geometry structure to a list of array geometry structures. This is the list consulted in the step 620 to determine whether an array geometry structure has been created for a specified physical grid.

Finally, in a step 634 the geometry manager 156 returns the array geometry structure to the application program 158 (if the geometry manager 156 was invoked at run time) or to the compiler 157 if the geometry manager 156 was invoked at compile time).

C source code to implement the bookkeeper 214 could be as follows. (Note that the source code handles some details and special cases not discussed above.)

```
static CMRT_array_geometry_t internal_intern_zero(rank,
        lower_bounds,
        upper_bounds)
    int4 rank;
    int8 *lower_bounds;
    int8 *upper_bounds;
{
    CMRT_array_geometry_t array_geometry;
```

-continued

```
    int i;
    array_geometry = find_matching_geometry(rank,
            lower_bounds,
            upper_bounds,
            NULL);
    /* Handle bookkeeping for an array with no array elements */
    if (array_geometry == NULL)
    {
        array_geometry = (CMRT_array_geometry_t)
            malloc(sizeof(struct CMRT_array_geometry));
        if (!array_geometry)
        {
            CMU_error("Could not allocate array geometry structure");
        }
        array_geometry->rank = rank;
        array_geometry->machine_geometry = NULL;
        /* Fill out lower and upper bounds in array geometry. */
        for (i = 0; i < rank; ++i)
        {
            array_geometry->lower_bounds[i] = lower_bounds[i];
            array_geometry->upper_bounds[i] = upper_bounds[i];
            array_geometry->extents[i] =
                (upper_bounds[i] - lower_bounds[i]) + 1;
        }
        array_geometry->garbage_mask = NULL;
        array_geometry->number_of_elements = 0;
        add_to_interned_geometries(array_geometry);
    }
    return array_geometry;
}
static CMRT_array_geometry_t internal_intern(rank,
        lower_bounds,
        upper_bounds,
        orders,
        off_chip_positions,
        off_chip_lengths,
        subgrid_lengths,
        is_serial,
        highest_axis_varies_fastest)
    int4 rank;
    int8 *lower_bounds;
    int8 *upper_bounds;
    CMCOM_order_t *orders;
    int4 *off_chip_positions;
    int4 *off_chip_lengths;
    int4 *subgrid_lengths;
    log4 *is_serial;
    log4 highest_axis_varies_fastest;
{
    int i, need_a_garbage_mask;
    CMCOM_machine_geometry_t machine_geometry;
    CMRT_array_geometry_t array_geometry;
    int4 garbage_mask_size;
    /*
    * Handle bookkeeping for array having >0 array elements */
    */
    machine_geometry =
        CMCOM_intern_geometry(rank,
            orders,
            off_chip_positions,
            off_chip_lengths,
            subgrid_lengths,
            is_serial,
            highest_axis_varies_fastest);
    array_geometry = find_matching_geometry(rank,
            lower_bounds,
            upper_bounds,
            machine_geometry);
    if (array_geometry == NULL)
    {
        array_geometry = (CMRT_array_geometry_t)
            malloc(sizeof(struct CMRT_array_geometry));
        array_geometry->rank = rank;
        if (!array_geometry)
        {
            CMU_error("Could not allocate array geometry structure");
        }
        array_geometry->machine_geometry = machine_geometry;
        need_a_garbage_mask = FALSE;
        array_geometry->number_of_elements = 1;
```

-continued

```
for (i = 0; i < rank; ++i)
{
    array_geometry->lower_bounds[i]= lower_bounds[i];
    array_geometry->upper_bounds[i]= upper_bounds[i];
    array_geometry->extents[i] =
        (upper_bounds[i] - lower_bounds[i]) + 1;
    array_geometry->number_of_elements *=
        array_geometry->extents[i];
    if(array_geometry->extents[i] !=
        (subgrid_lengths[i] << off_chip_lengths[i]))
    {
        need_a_garbage_mask = TRUE;
    }
}
/* if we are not using all of the processors, garbage 'em out. */
if(machine_geometry->total_off_chip_length < cmrt_pe_length)
{
    need_a_garbage_mask = TRUE;
}
/* Create garbage mask, only if necessary. */
if (need_a_garbage_mask)
{
    garbage_mask_size =
        CMCOM_calculate_garbage_mask_size(machine_geometry);
    array_geometry->garbage mask =
        CMRT_allocate_physical_heap_field(garbage_mask_size);
    CMCOM_create_garbage_mask(array_geometry->extents,
        machine_geometry,
        array_geometry->garbage_mask);
}
else
{
    array_geometry->garbage_mask = NULL;
}
add_to_interned_geometries(array_geometry);
}
return array_geometry;
}
© Copyright Thinking Machines Corporation, 1991
```

Computation Minimizing Mapper—Structure and Method

As stated, the present invention maps an array to subgrids by one of three techniques. The first technique, which is used to minimize computation time, is described in this section. According to the first technique, the area of each subgrid, and therefore the number of array elements distributed to each PE 112, is minimized.

Figure 7:
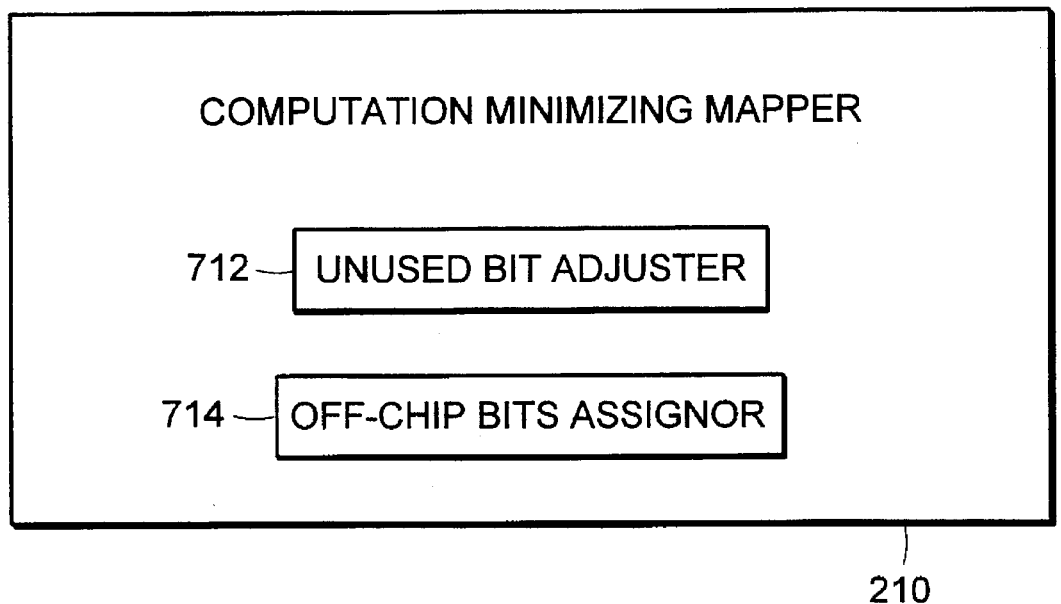
FIG. 7 is a block diagram which illustrates the structure of the computation minimizing mapper.
Figure 8A:
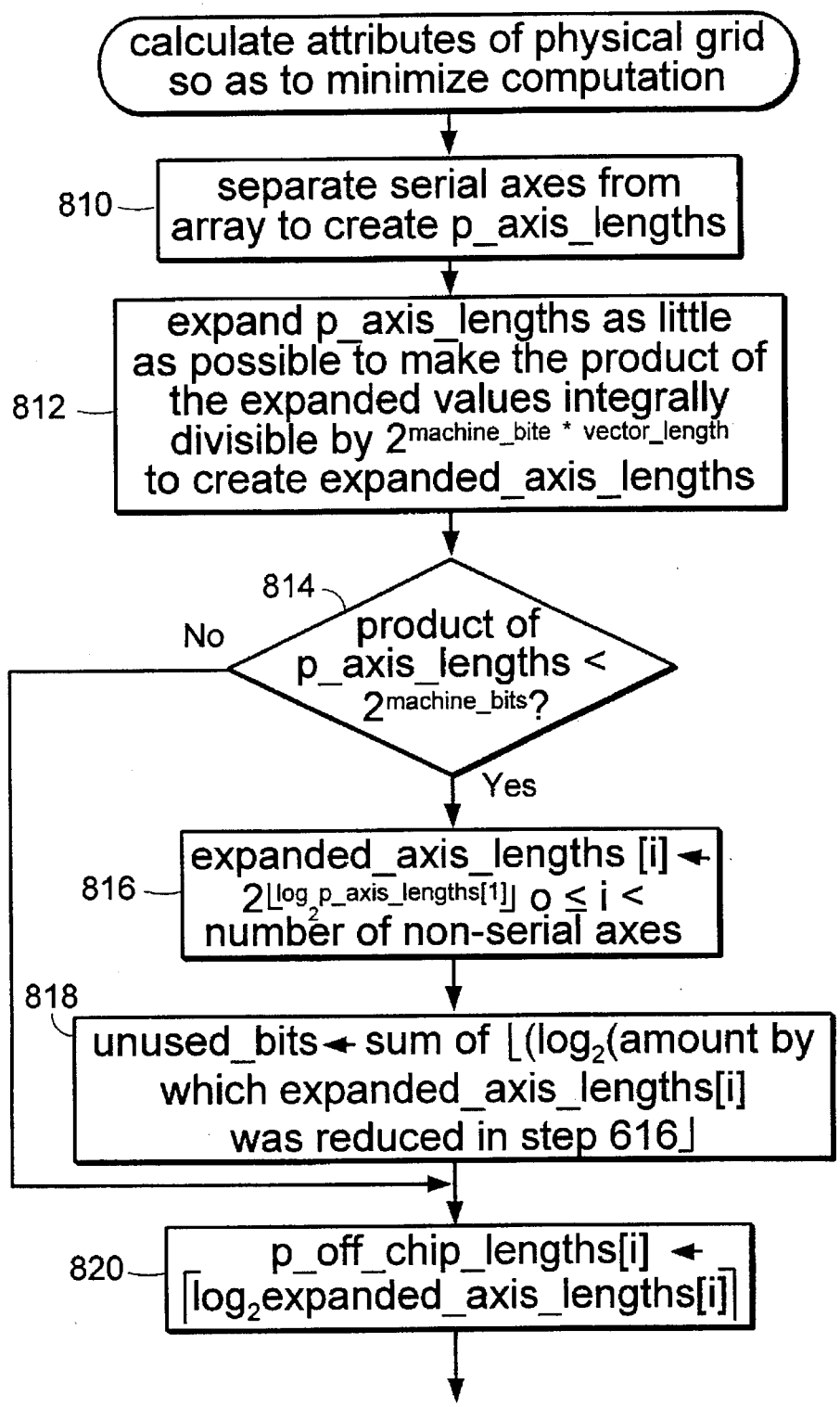
FIGS. 8A and 8B are a flowchart which illustrates the operation of the computation minimizing mapper.
Figure 8B:
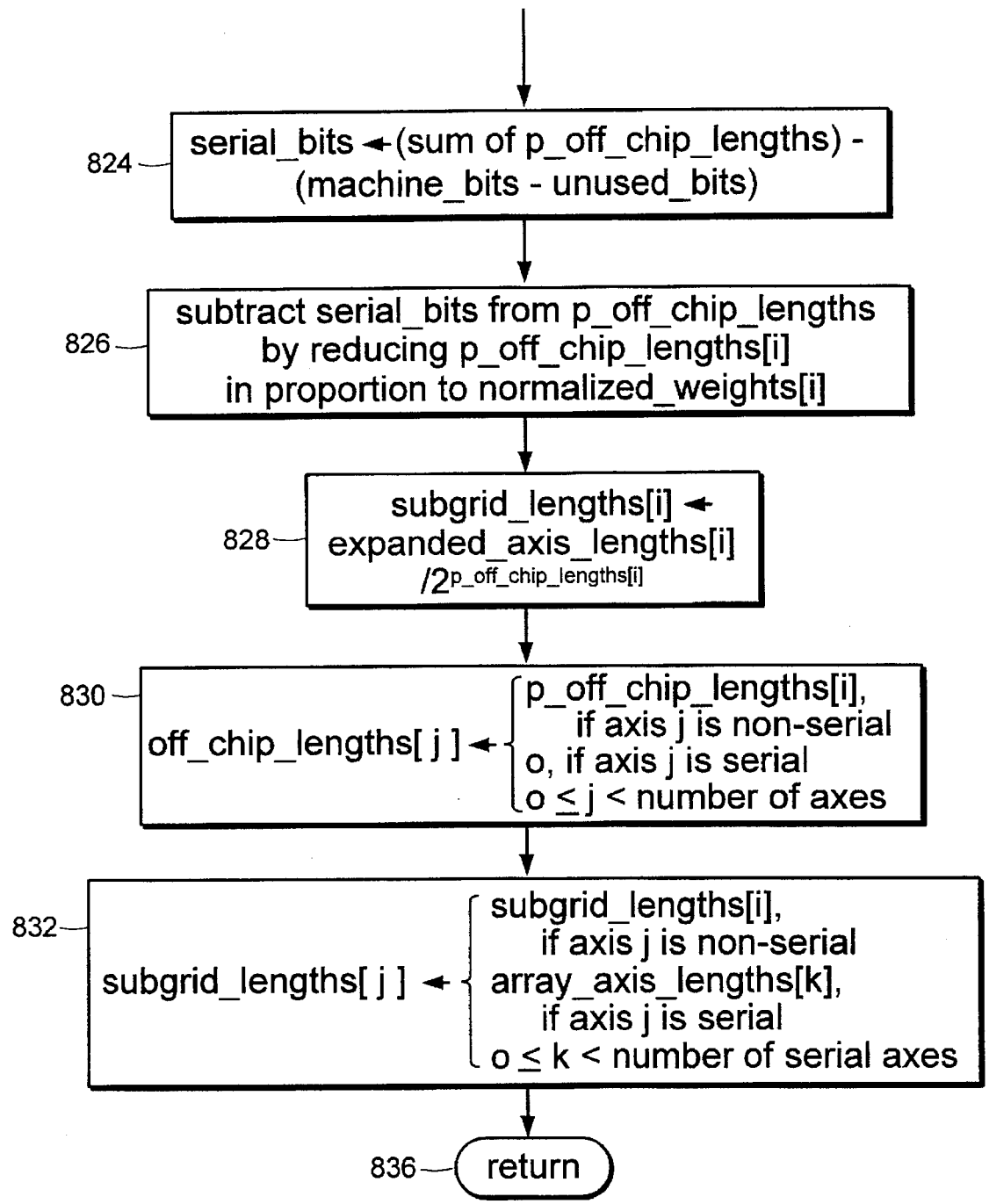

FIG. 7 shows the structure of the computation minimizing mapper 210 of FIG. 2. The computation minimizing mapper 210 comprises an unused bit adjuster 712 and an off-chip bits assigner 714. FIGS. 8A and 8B are a flowchart which illustrates the operation of the modules of FIG. 7 in calculating attributes of a physical grid so as to minimize computation.

Looking at FIG. 8A, in a step 810 the computation minimizing mapper 210 first separates the serial axes from the non-serial axes. It could do so, for example, with the following C code:

```
/* figure out what the array looks like without the serial axes */
parallel_rank = 0;
for(axis = 0; axis < rank; ++axis)
{
    if(is_serial[axis] == FALSE)
    {
        parallel_axis_lengths[parallel_rank] = axis_lengths[axis];
        parallel_weights[parallel_rank] = weights[axis];
        parallel_rank++;
    }
}
```

Steps 812–828 are then carried out on the non-serial axes.

In a step 812, the grid expander 213 calculates the axis lengths of the physical grid (called expanded axis lengths) by expanding the non-serial (i.e., parallel) axis lengths (called p_axis lengths) as little as possible to make the product of the expanded axis lengths integrally divisible by a machine-specific value. This value is generally the number of PEs 112 on the data parallel computer 110. For vector machines, however, this value is the vector length times the number of PEs 112. The log to the base two of this value, referred to as minimum_serial_bits, is passed to the geometry manager 156 from the application program 158. The grid expander 213 is described in greater detail below in the section entitled "Grid Expander—Structure and Method".

Next, in a step 814, the unused bits adjuster 712 determines whether the number of array elements is less than the number of PEs 112. If so, then it performs steps 816 and 818.

In the step 816, the unused bit adjuster 712 divides each expanded axis length by two until the result is odd, thus calculating the smallest power of two which is not less than the corresponding non-serial array axis length. The unused bit adjuster 712 keeps track of the total number of right-shifts it performs to carry out the step 818 of calculating the total number of unused bits. The steps 814, 816 and 818 could be implemented with the following C code:

```
/*
 * adjust_for_unused_bits looks for axes which have been expanded
with
 * extra powers of two. This will happen when the total array size is
 * smaller than the machine size, and in such cases we want to use
fewer
 * than all of the available off-chip bits.
 */
static int4 adjust_for_unused_bits(rank, machine_bits,
        axis_lengths, expanded_axis_lengths)
    int4 rank;
    int4 machine_bits;
    int8 *axis_lengths;
    int8 *expanded_axis_lengths;
{
    int4 i;
    int4 unused_bits = 0;
    for(i = 0; i < rank; ++i)
    }
        while((axis_lengths[i] <= (expanded_axis_lengths[i] >> 1)) &&
        (machine_bits > 0))
        {
            expanded_axis_lengths[i] >>= 1;
            unused_bits++; /* count the number of machine bits we won't
use */
            machine_bits--; /* limit the number of unused machine bits */
        }
    }
    return unused_bits;
```

Steps 820, 822, 824 and 826 show the operation of the off-chip bits assigner 714, which calculates the number of off-chip bits for each non-serial axis. In the step 820, the off-chip bits assigner 714 calculates an initial value of p_off_chip_lengths by determining the number of power-of-two bits in each of the expanded axis lengths. In the step 824, it calculates the number of serial bits (i.e., those which identify the subgrid coordinates) p_off_chip_lengths by subtracting the number of "machine bits used" from the sum of the p_off_chip_lengths calculated in the step 820. The value of machine_bits used is calculated by subtracting the number of unused bits calculated in the step 816 (or 0, if the step 816 was not carried out) from machine_bits.

Next, in a step 826, the sum of the p_off_chip_lengths is reduced by subtracting the number of serial bits. More specifically, weights associated with the axes are normalized, and the p_off_chip_lengths of the axes are reduced in proportion to the normalized weights. The programmer specifies the axis weights in the application program 158.

The following C code could be used to implement the off-chip bits assigner 714:

```
static int ptwo_bits(x)
        int x;
{
        int bits = 0;
        while((x > 0) && ((x & 1) == 0))
        {
                x >>= 1;
                ++bits;
        }
        return bits;
}
static void assign_serial_bits_by_weight(rank, serial_bits,
                weights, off_chip_lengths)
        int4 rank;
        int4 serial_bits;
        int4 *weights;
        int4 *off_chip_lengths;
{
        int i;
        /*
         * Attempt to assign on-chip bits according to weight.
         */
        if(weights)
        {
                int weights_total;
                double normalized_weights[CMCOM_MAX_RANK];
                weights_total = 0;
                for(i = 0; i < rank; ++i)
                {
                        if(weights[i] < 0)
                        {
                                normalized_weights[i] = 0;
                        }
                        else
                        {
                                weights_total +=
                                (normalized_weights[i] = weights[i] * off_chip_lengths[i]);
                        }
                }
                if(weights_total)
                {
                        double normalizer = (double) serial_bits / (double)
weight_total;
                        int assigned_bits;
                        for(i = 0; i < rank; ++i)
                        {
                                assigned_bits = normalizer * normalized_weights[i];
                                if(assigned_bits > off_chip_lengths[i])
                                {
                                        /* avoid float rounding errors */
                                        assigned_bits = off_chip_lengths[i];
                                }
                                off_chip_lengths[i] -= assigned_bits;
                                serial_bits -= assigned_bits;
                        }
                }
        }
        /* Now just cycle through the axes and take away off-chip bits */
        i = 0;
        while(serial_bits)
        {
                if(off_chip_lengths[i]> 0)
                {
                        off_chip_lengths[i]--;
                        serial_bits--;
                }
                if(++i == rank) i = 0;
        }
}
/*
 * Calculate the off_chip_lengths based upon the expanded axis sizes.
 */
for(i = 0, total_available_bits = 0; i < rank; ++i)
{
        total_available_bits +=
        (off_chip_lengths[i] = ptwo_bits(expanded_axis_lengths[i]));
}
/*
 * But we don't really want all of the power-of-two bits to be
 * off-chip, we only need enough for the machine. Decrease the
 * power-of-two bits as necessary, taking into account the
 * weights, so that we have the right number of off-chip bits (the
 * other bits are serial bits, not to be confused with serial axes,
 * which are still out of the picture at this point).
 */
serial_bits = total_available_bits - (machine_bits - unused_bits);
assign_serial_bits_by_weight(rank, serial_bits, weights,
        off_chip_lengths);
        © Thinking Machines Corporation 1991.
```

In a step 828, the computation minimizing mapper 210 calculates the subgrid length of each non-serial axis by dividing the expanded axis length in that axis by the number of subgrids in that axis. Note that the number of subgrids in an axis "i" is $2^{p\_off\_chip\_lengths[i]}$.

In steps 830 and 832, the computation minimizing mapper 210 recombines the serial and non-serial axes. As explained, elements along a serial axis are mapped to a single PE 112. Serial axes therefore require no off-chip bits. Accordingly, in the step 830 the computation minimizing mapper 210 sets the off-chip length to 0 for serial axes, and to p_off_chip_lengths[j] calculated above for each non-serial axis "j".

In the step 832, the computation minimizing mapper 210 sets the subgrid lengths for the serial and non-serial physical grid axes. Because the elements of a serial axis are mapped to a single PE 112, serial axes of the physical grid are not divided into subgrids. Accordingly, the computation minimizing mapper 210 sets the subgrid length to the array length for serial axes, and to the subgrid length calculated above for non-serial axes.

The steps 830 and 832 could be implemented with the following C code:

```
/* put the serial axes back */
parallel_rank = 0;
for(axis = 0; axis < rank; ++axis)
{
        if(is_serial[axis])
        {
                off_chip_lengths[axis]= 0;
                subgrid_lengths[axis] = axis lengths[axis];
        }
        else
        {
                off_chip_lengths[axis] = parallel_off_chip_lengths[parallel_rank];
                subgrid_lengths[axis] = parallel_subgrid_lengths[parallel_rank];
                parallel_rank++;
        }
}
© Thinking Machines Corporation, 1991.
```

Finally, in a step 836, flow of control returns to the geometry manager 156.

Communication Reducing Mapper—Structure And Method

Figure 9:
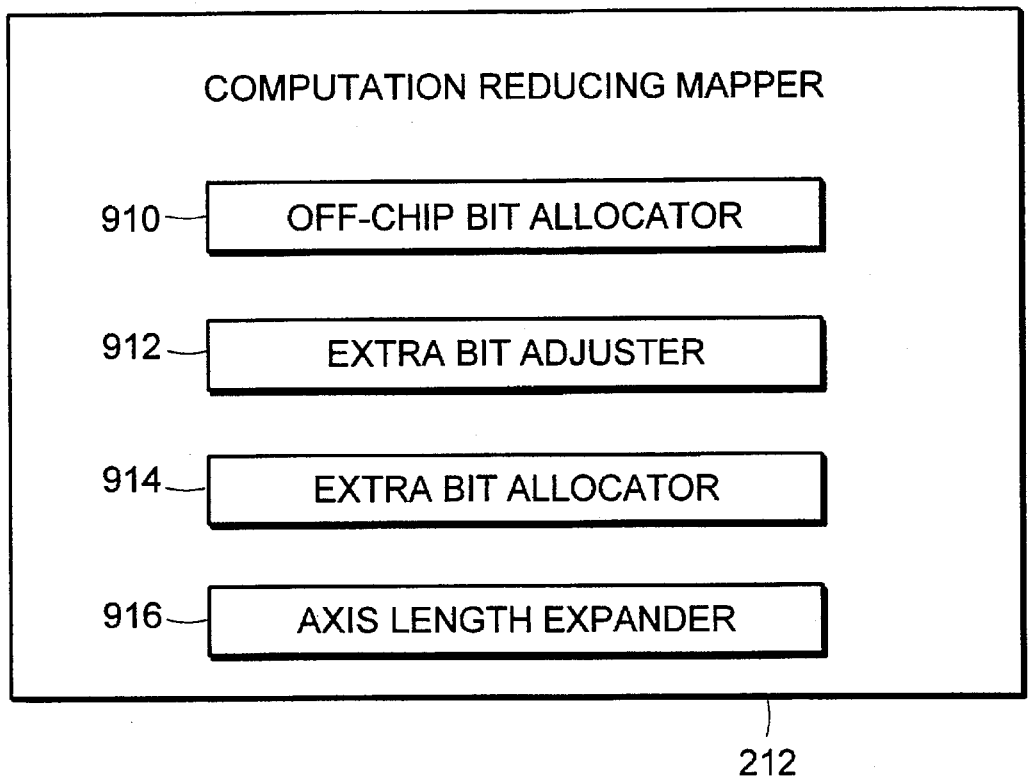
FIG. 9 is a block diagram which illustrates the structure of the communication reducing mapper.
Figure 10A:
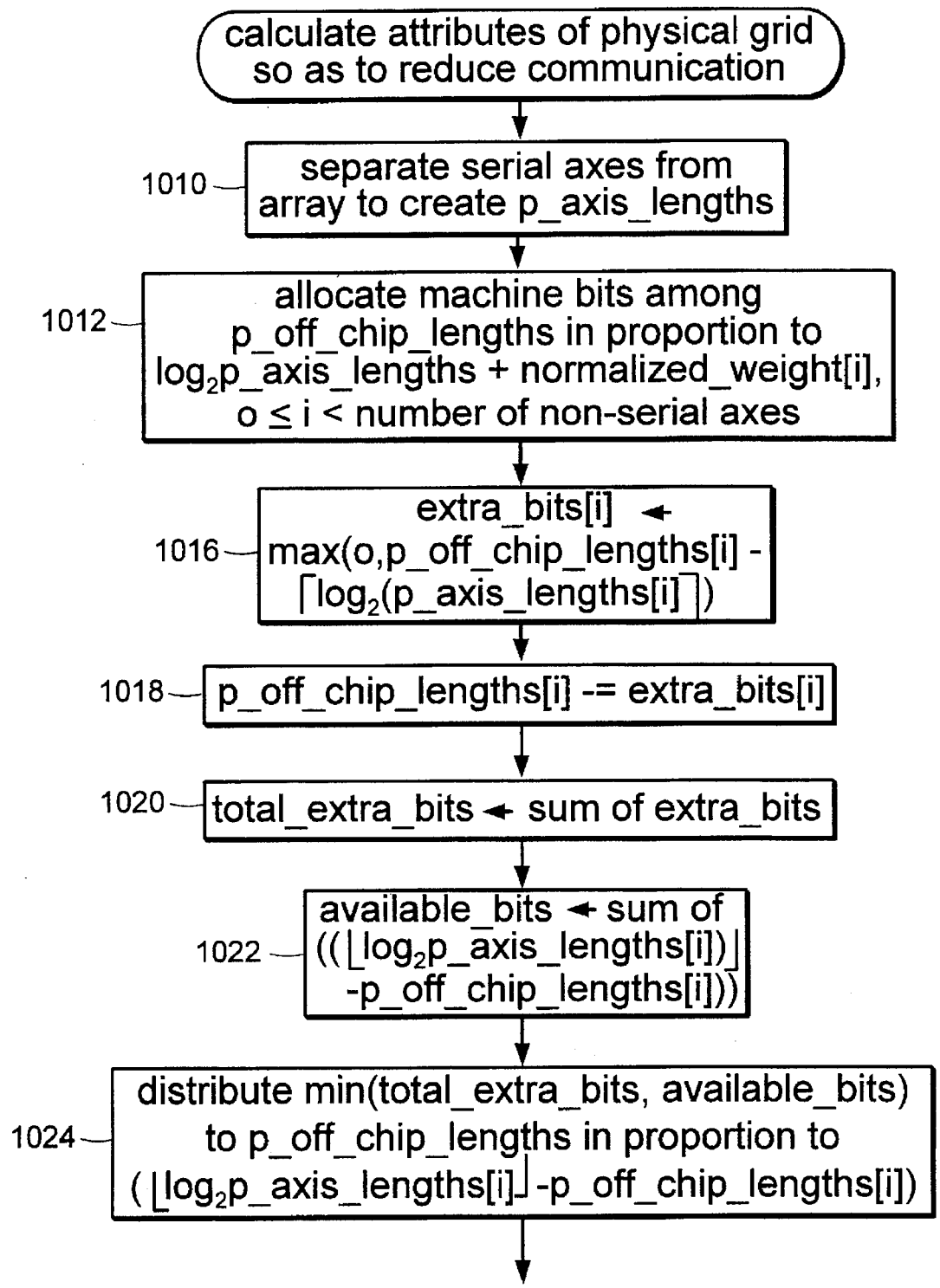
FIGS. 10A and 10B are a flowchart which illustrates the operation of the communication reducing mapper.
Figure 10B:
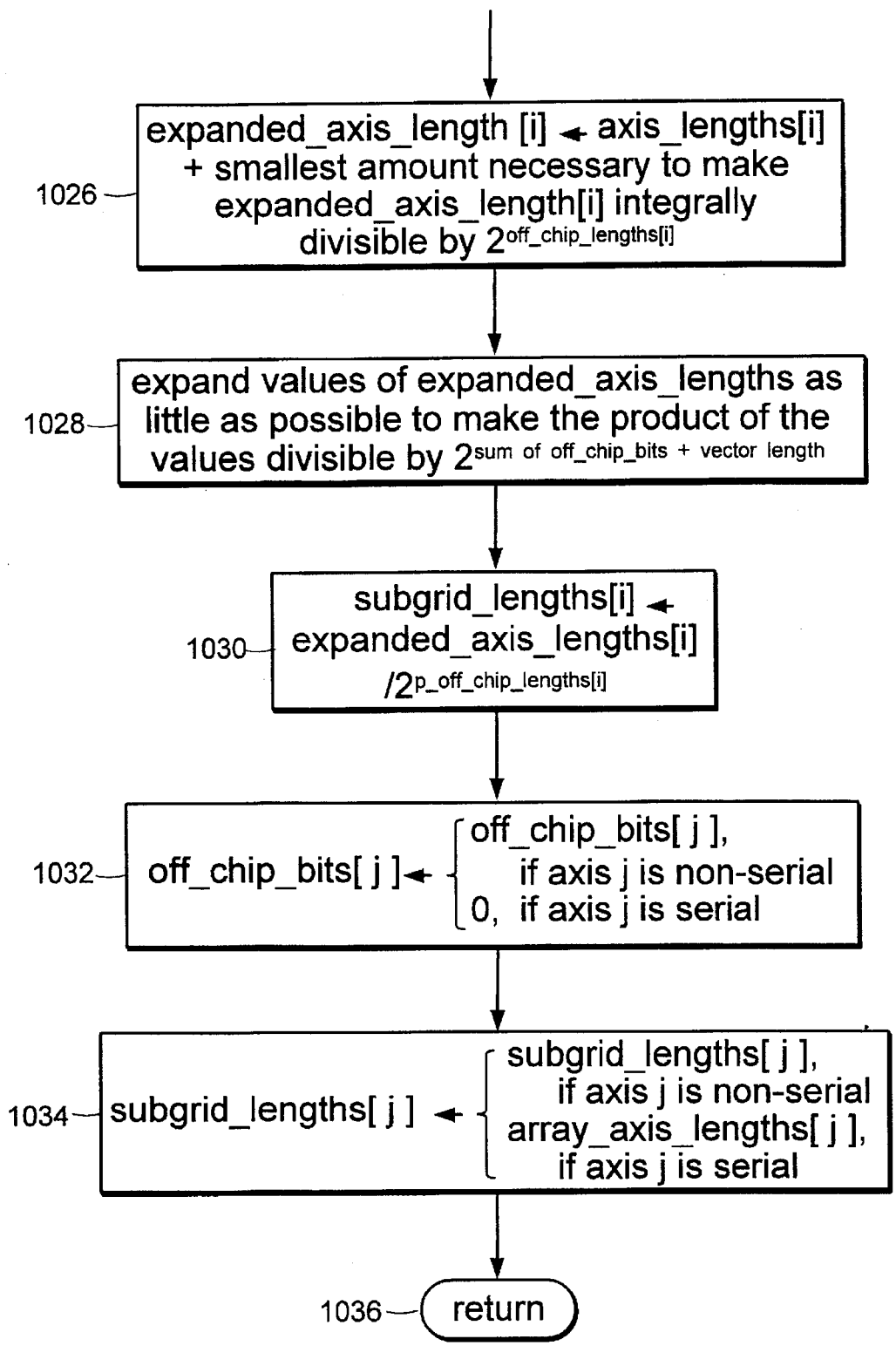

FIG. 9 is a block diagram of the structure of the communication reducing mapper 212 of FIG. 2. Looking at FIG. 9, the communication reducing mapper 212 comprises an off-chip bit allocator 910, an extra bit adjuster 912 and an extra bit allocator 914. FIGS. 10A and 10B show a flowchart which illustrates the operation of the modules of FIG. 9 in calculating attributes of a physical grid so as to minimize communication.

Looking at FIG. 10A, in a step 1010 the communication reducing mapper 212 separates the serial axes from the non-serial axes so as to create an array called "p_axis_lengths". It carries out the step 1010 in the same way that the computation minimizing mapper 210 carries out the step 810. Next, in a step 1012, the off-chip bit allocator 910 calculates the off-chip bits by allocating the machine bits among the non-serial axes. More specifically, the off-chip bit allocator 910 calculates the total of the weights, and then allocates the machine bits among the off_chip_lengths in proportion to $\log_2$ p_axis_lengths[i] plus the portion of the total weight associated for each non-serial axis "i". In a step 912, the communication reducing mapper 212 normalizes the weights associated with the non-serial axes. It does so by setting the weight associated with each axis to the appropriate proportion of the sum of all of the weights.

Next, in a step 1016, the extra bit adjuster 912 calculates the number of extra bits in each axis by, for each non-serial axis, calculating the amount by which the number of off-chip bits allocated to the axis exceeds the number of bits needed to represent the length of that axis. In a step 1018, the extra bit adjuster 912 reduces the off-chip length of each axis by the number of extra bits calculated for that axis.

In a step 1020, the extra bit allocator 914 calculates the total number of extra bits by summing the extra bits calculated (in the step 1018) for all of the axes. In a step 1022, the extra bit allocator 914 calculates the number of available bits by summing, over all i, the amount by which the number of bits needed to represent the length of i exceeds p_off_chip_lengths[i]. In a step 1024, the extra bit allocator 914 allocates either the total number of extra bits or the number of available bits (whichever is smaller) among the off-chip lengths of the non-serial axes. It allocates these bits in proportion to the amount by which $\log_2$(p_axis_lengths[i]) exceeds $\log_2$(p_off_chip_lengths[i]).

In a step 1026, the axis length expander 213 calculates the axis lengths of a physical grid by expanding each non-serial array axis length "i" (if necessary) $2^{p\_off\_chip\_lengths[i]}$. Because each of the extended axis lengths is a power of 2, the product of the extended axis lengths is a power of 2. Therefore, it may not be necessary to invoke the grid expander 213.

However, the axis length expander 915 does not guarantee that the product of the expanded axis lengths will be divisible by the vector length of a vector machine. Therefore, in a step 1028 the communication reducing mapper 212 invokes the grid expander 213 to further expand then on-serial axis lengths (if necessary) so that the product of the expanded axis lengths is divisible by the vector length of vector machines.

In a step 1030, the communication reducing mapper 212 calculates the subgrid lengths in the same manner as in the step 828 of FIG. 8B. In a step 1032, the communication reducing mapper 212 inserts the serial and non-serial off-chip bit lengths into an array called off_chip_lengths, as in the step 830 of FIG. 8B. In a step 1034, the communication reducing mapper 212 inserts the serial and non-serial subgrid lengths into an array called subgrid_lengths, as in the step 832 of FIG. 8B. Finally, in a step 1036, flow of control returns to the geometry manager 156.

Grid Expander—Structure And Method

Figure 11:
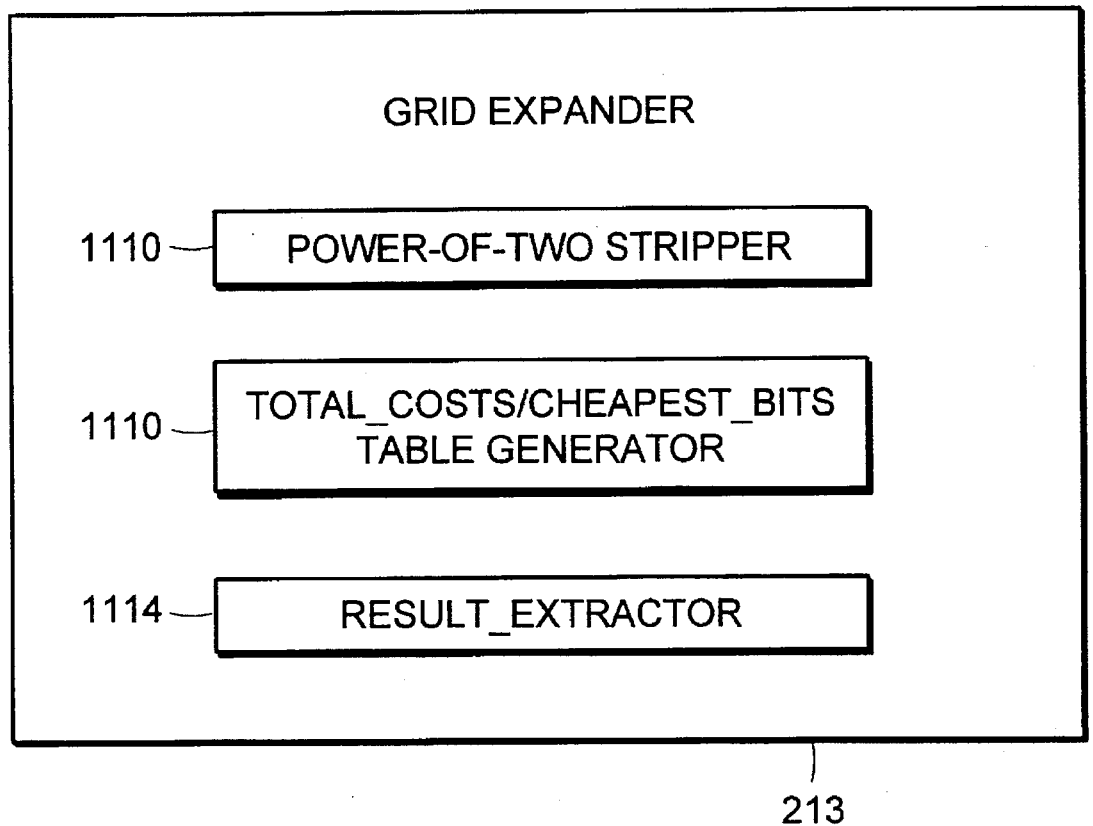
FIG. 11 is a block diagram which illustrates the structure of a grid expander of the computation reducing mapper and of the communication reducing mapper.
Figure 12A:
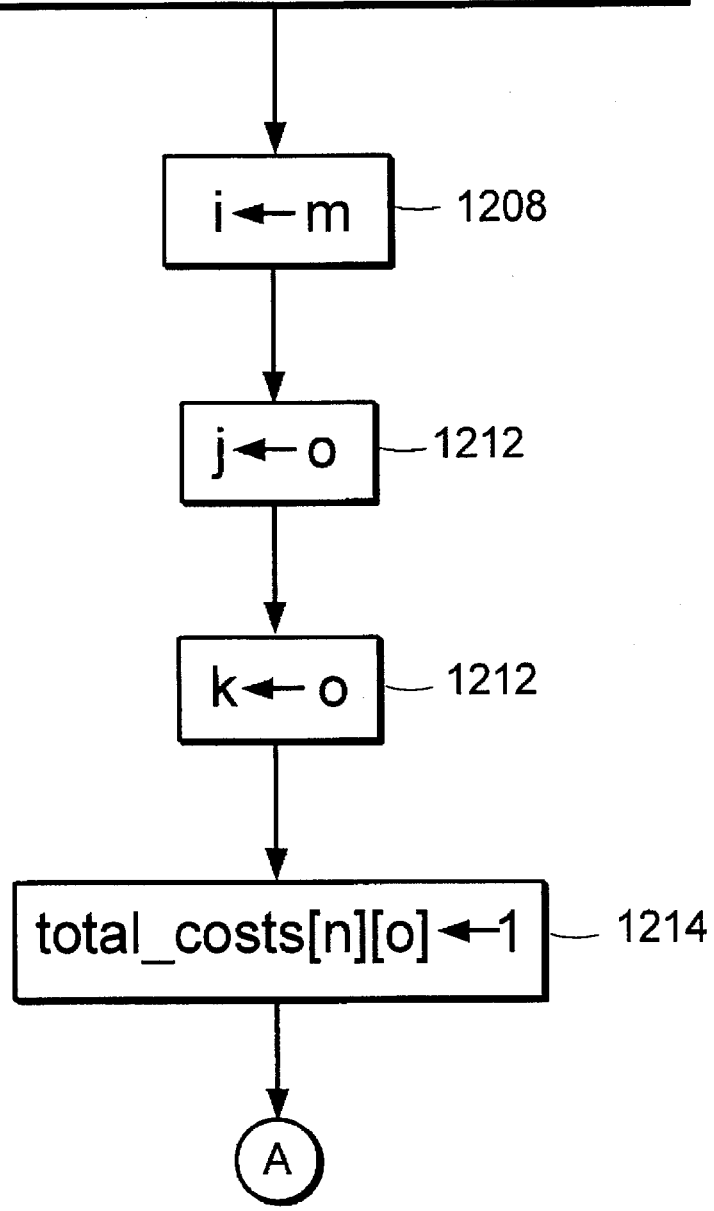
FIG. 12A–12C are a flowchart which illustrates the operation of the grid expander of FIG. 10.
Figure 12B:
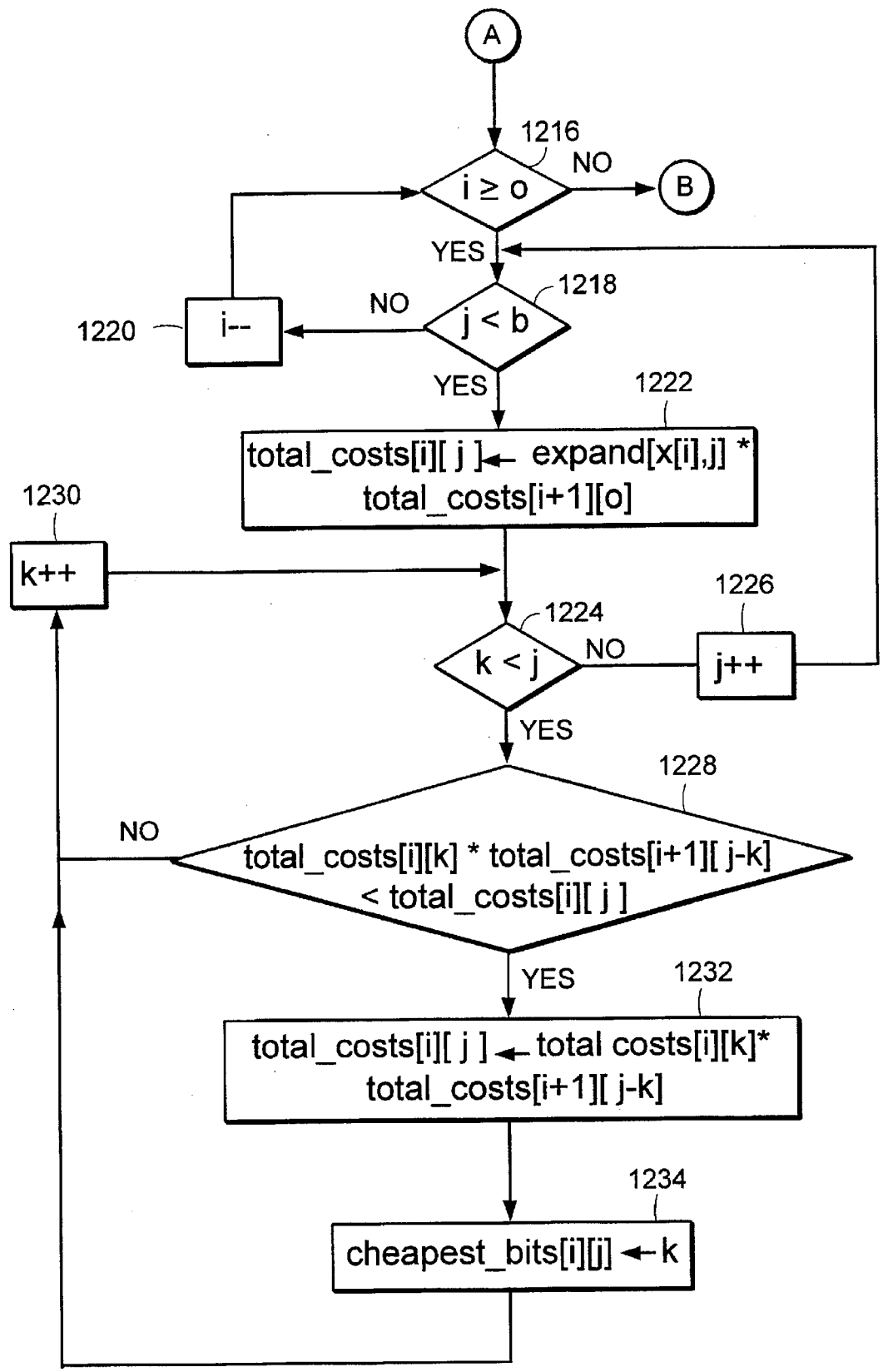
Figure 12C:
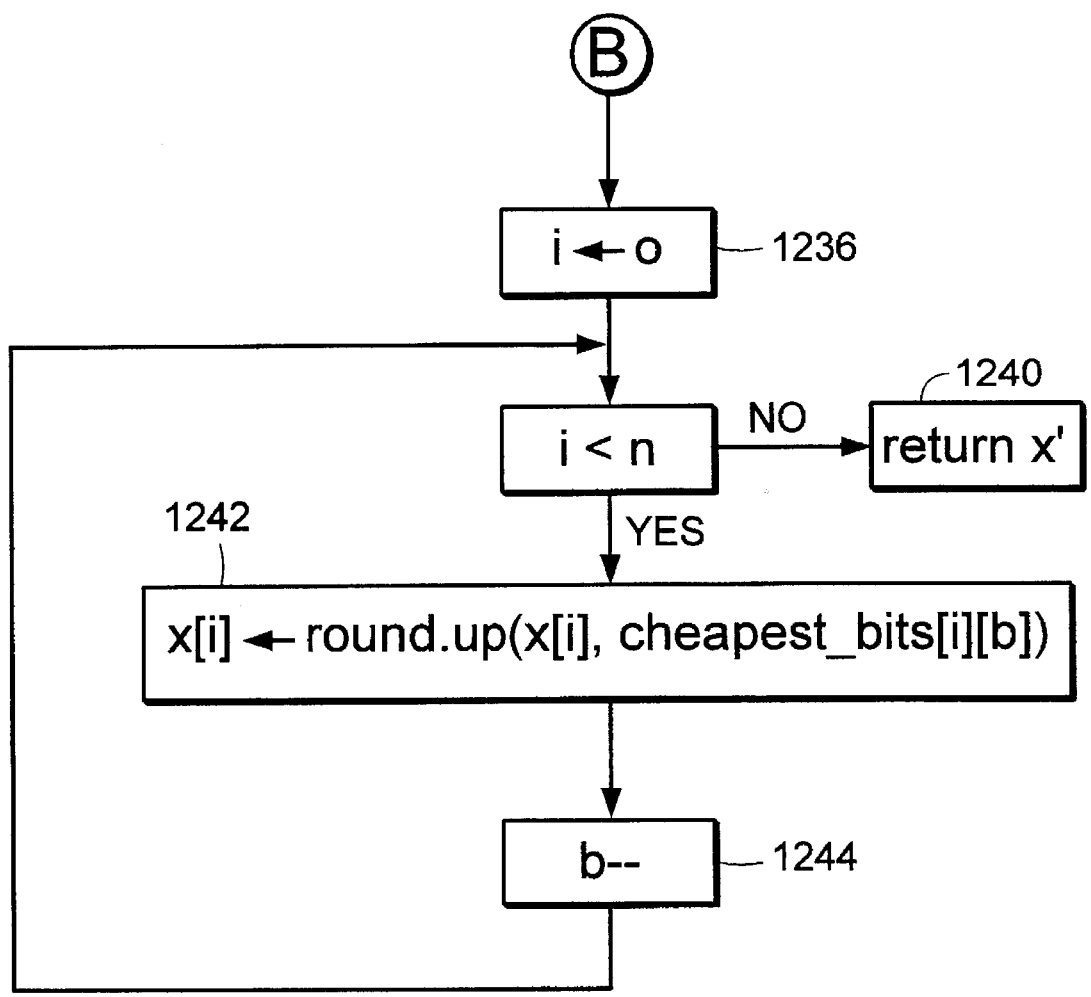

FIG. 10 is a block diagram of the structure of the grid expander 213 of FIG. 11. Looking at FIG. 11, the grid expander 213 comprises a total cost/cheapest bits table generator 1110 and a result extractor 1112. FIGS. 12A, 12B and 12C are a flowchart which illustrates the operation of the grid expander. Essentially, the grid expander 213 operates as follows. It receives an array x[] of n axis lengths and a value b from either the computation minimizing mapper 210 or the communication minimizing mapper 212. The grid expander 213 expands the axis lengths of x as little as possible to make the product of the values integrally divisible by $2^b$. It inserts the expanded axis lengths in an array x', and returns x' to the computation minimizing mapper 210 or the communication minimizing mapper 212. The total cost/cheapest bits table generator 1110 generates a total_costs table and a cheapest_bits table. Each value total_costs[i][j] is the product of the upper n-i elements of x, minimally expanded so as to be integrally divisible by $2^j$. The values of each column of total_costs are calculated in a dynamic programming manner. That is, the total_costs/cheapest_bits table generator 1110 calculates the values total_costs[i][] from the values it calculated for total_costs[i+1][].

Each value cheapest_bits[i][j] is the number of powers of two that would be contributed by x'[i] if x' were being minimally expanded to have j powers of two. Result extractor 1112 generates x' by rounding up the values of x[i] to the smallest multiple of $2^{cheapest\_bits[i][p]}$, where p=b−(powers of two provided by the previous axes).

Looking at FIG. 12A, in steps 1208, 1210 and 1212, the grid expander 213 initializes counters i, j and k to zero. In a step 1214, the grid expander 213 initializes total_costs [n][0] to 1.

Looking at FIG. 12B, in a step 1216, the total_costs/cheapest_bits table generator 1110 determines whether i is ≧0 [i is initialized to n]. If not, then flow of control of the grid expander 213 goes to a step ???, which is described below.

Otherwise, in a step 1218, the total_costs/cheapest_bits table generator 1110 determines whether j is <b. If not, then in a step 1220, the value of i is decremented, and then flow of control returns to the step 1216.

Otherwise, in a step 1222, the total_costs/cheapest_bits table generator 1110 sets total_costs[i][j] to the product of "round_up"(x[i,j]) * total_costs[i+1][0]. Next, in a step 1224, the total_costs/cheapest_bits table generator 1110 determines whether k is <j. If not, then in a step 1226, j is incremented, and then flow of control returns to the step 1218.

Otherwise, in a step 1228, the total_costs/cheapest_bits table generator 1110 determines whether the product of total_costs[i][k] and total_costs[i+1][j-k] is <total_costs [i][j]. If not, then in a step 1230, k is incremented, and then flow of control returns to the step 1224.

Otherwise, in a step 1232, the total_costs/cheapest_bits table generator 1110 sets total_costs[i][j] to the product of total_costs[i][k] and total_costs[i+1][j-k]. In a step 1234, the total_costs/cheapest_bits table generator 1110 sets cheapest_bits[i][j] to k. Flow of control the goes to the step 1230.

Looking at the FIG. 12C, in a step 1236, the result_extractor 1112 resets the counter i to zero. In a step 1238, the result_extractor 1112 determines whether the value of i is <n. If not, then the result_extractor returns the array x' to either the computation minimizing mapper 210 or the communication reducing mapper 212 (whichever invoked the grid expander 213).

Otherwise, in a step 1242, the result_extractor 1112 sets x'[i] to round_up(x[i], cheapest_bits[i][b]). The round_up function rounds the value of x[i] up to the smallest multiple of $2^{cheapest\_bits[i][b]}$. Finally, in a step 1244, the result extractor 1112 decrements b.

The grid expander 213 could be implemented with the following C code:

```
#define MAXRANK CMCOM_MAX_RANK
#define MAXBITS 31
typedef struct geometry_struct {
    int numdims;
    int dims[MAXRANK];
} Geometry, *Geometry_Ptr;
/* Subroutine to round axes for non-power-of-two VPs.
   Inputs:
     x[] Array of axis lengths
     n Number of axes
     b Desired minimum number of power-of-two bits.
       For example, an 8K CM-2 with 256 Weiteks would have
       nbits = 10 (8 for the Sprint nodes, 2 for the odd_factor)
   Outputs:
```

-continued

```
    x_prime[] Array of new axis lengths; their product is a multiple of
2^b
    Algorithm:
        This is an exhaustive search and should always provide the correct
result.
        The idea here is to use dynamic programming, one axis at a time.
        The array total_costs[i][j] is the cost of providing j powers of two
assuming that only axes >= i are considered for rounding up.
        This array is filled in for descending values of i, so the computation
of total_costs[i][] depends on total_costs[i+1][] having been
already computed. Two important optimizations require special
treatment of the last-computed axis (arbitrarily chosen to be axis 0).
        First, only total_costs[0][b] is computed; total_costs[0][j] is not
computed for j!=b. Second, only for i=0 is x[i] allowed to be
rounded up
            to a value greater than 2^ceiling(log2(x[i])); this saves lots of
searching.
        Author: Guy Steele, July 3, 1990. Updated July 5 for overflow
            checking and picking off free factors of two.
*/
static void assign_bits_gls3 (n, b, x, x_prime)
    int n; /* the rank of x and x_prime */
    int b; /* the number of bits needed */
    int *x; /* the initial array of numbers, don't modify this */
    int *x_prime; /* put your answer into this array */
{
    /* axis_costs[i][j] is simply x[i] rounded up to a multiple of 2^j */
    unsigned total_costs[MAXRANK+1][MAXBITS];
    unsigned cheapest_bits[MAXRANK+1][8 MAXBITS];
    unsigned axis_costs[MAXBITS];
    unsigned xx[MAXRANK], p2bits[MAXRANK];
    int i, j, k, limit, prev_limit, bits_remaining;
    /* First peel off "free" factors of 2. */
    bits_remaining = b;
    for (i=0; i<n; i++) {
        int xi = x[i], p2 = 0;
        while (!(xi & 1)) { xi >>= 1; ++p2;}
        xx[i] = xi;
        p2bits[i] = p2;
        bits remaining -= p2;
    }
    if (bits_remaining <= 0) {
        for (i=0; i<n; i++) x_prime[i]= x[i];
    }
    else {
        limit = 0;
        total_costs[n][0] = 1;
        for (i=n-1; i>0; i--) {
            prev_limit = limit;
            for (j=0; j<=bits_remaining && ((j <= prev_limit) || ((1 << (j-
prev_limit-1)) <= xx[i])); j++) {
                int mask = ((-1) << j);
                axis_costs[j] = (xx[i] + ~mask) & mask;
            }
            limit = j-1;
            for (j=0; j< =limit; j++) {
                int sublimit = (j < prev_limit) ? j : prev_limit;
                unsigned cost = axis_costs[j-sublimit] * total_costs[i+1]
[sublimit];
                int cheapest = j-sublimit;
                for (k=sublimit-1; k>=0; k--) {
                    unsigned trycost = axis_costs[j-k] * total_costs[i+1][k];
                    if (trycost >= (1 << MAXBITS)) break;
                    if (trycost < cost) {
                        cost = trycost;
                        cheapest = j-k;
                    }
                }
                total_costs[i][j] = cost;
                cheapest_bits[i][j] = cheapest;
            }
        }
        prev_limit = limit;
        /* The end-test is different on this for-loop so that this axis
            will be able to soak up extra powers of two if b is large. */
        for (j=0; j<=bits_remaining; j++) {
            int mask = ((-1) << j);
            axis_costs[j] = (xx[0] + ~mask) & mask,;
        }
        /* For i=0 only interested in j=bits_remaining. */
        {
            int sublimit = (bits_remaining < prev_limit) ? bits_remaining :
prev_limit;
            unsigned cost = axis_costs[bits_remaining-sublimit] *
total_costs[1][sublimit];
            int cheapest = bits_remaining-sublimit;
            for (k=sublimit-1; k>=0; k--) {
                unsigned trycost = axis_costs[bits_remaining-k] * total_costs[1]
[k];
                if (trycost >= (1 << MAXBITS)) break;
                if (trycost < cost) {
                    cost = trycost;
                    cheapest = bits_remaining-k;
                }
            }
            total_costs[0][bits_remaining] = cost;
            cheapest_bits[0][bits_remaining] = cheapest;
        }
        /* Now extract the results. */
        for (i=0; i<n; i++) {
            int nbits = cheapest_bits[i][bits_remaining];
            int mask = ((-1) << nbits);
            x_prime[i] = ((xx[i]+ ~mask) & mask) << p2bits[i];
            bits_remaining -= nbits;
        }
    }
}
```

CONCLUSION

Aspects of the present invention, as described above, are further described in the patent applications entitled "System and Method for Optimizing and Generating Computer Based Code In a Parallel Processing Environment: "System and Method for Compiling Towards a Super-pipelined Architecture", and "Vector Parallel Machine Model". These patent applications are cited above.

While various embodiments of the present invention have been described above, it should be understood that they have been presented by way of example only, and not limitation. Thus, the breadth and scope of the present invention should not be limited by any of the abovedescribed exemplary embodiments, but should be defined only in accordance with the following claims and their equivalents.

We claim:

1. A computer-based method for mapping an array to processing elements (PEs) of a data parallel computer comprising the steps of:

a. receiving attributes of the array;

b. expanding axis lengths of the array to create expanded axis lengths of a physical grid;

c. integrally dividing each of said expanded axis lengths into a number of subgrid lengths so as to create a number of equally sized subgrids of said physical grid;

d. outputting said subgrid lengths to indicate a location in one of said subgrids given a location of an element in the array; and e. outputting the number of subgrid lengths into which each of said expanded axis lengths was divided to indicate a memory location of one of the PEs given said location in one of said subgrids.

* * * * *